(12) United States Patent
Ogawa

(10) Patent No.: US 10,124,678 B2
(45) Date of Patent: Nov. 13, 2018

(54) HYBRID VEHICLE CONTROL APPARATUS

(71) Applicant: TOYOTA JIDOSHA KABUSHIKI KAISHA, Toyota-shi, Aichi (JP)

(72) Inventor: Yuki Ogawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 3 days.

(21) Appl. No.: 15/215,141

(22) Filed: Jul. 20, 2016

(65) Prior Publication Data

US 2017/0021823 A1    Jan. 26, 2017

(30) Foreign Application Priority Data

Jul. 22, 2015 (JP) ................................ 2015-145352

(51) Int. Cl.
*B60W 20/14* (2016.01)
*B60W 10/26* (2006.01)
(Continued)

(52) U.S. Cl.
CPC ............... *B60L 7/18* (2013.01); *B60W 10/06* (2013.01); *B60W 10/08* (2013.01); *B60W 20/12* (2016.01); *B60W 50/0097* (2013.01); *B60W 30/18127* (2013.01); *B60W 2510/244* (2013.01); *B60W 2550/143* (2013.01); *B60W 2550/20* (2013.01); *B60W 2550/402* (2013.01);
(Continued)

(58) Field of Classification Search
None
See application file for complete search history.

(56) References Cited

U.S. PATENT DOCUMENTS 5,778,326 A    7/1998    Moroto et al.
6,131,680 A    10/2000   Nii et al.
(Continued)

FOREIGN PATENT DOCUMENTS

JP    H09-308012 A    11/1997
JP    2000-134719 A    5/2000
(Continued)

OTHER PUBLICATIONS

Jun. 16, 2017 Office Action issued in U.S. Appl. No. 15/215,272.
Jan. 9, 2018 Office Action issued in U.S. Appl. No. 15/219,927.
Jul. 5, 2018 Office Action issued in U.S. Appl. No. 15/219,927.

*Primary Examiner* — Mussa A Shaawat
*Assistant Examiner* — Kyung J Kim
(74) *Attorney, Agent, or Firm* — Oliff PLC

(57) ABSTRACT

A control apparatus for a hybrid vehicle including an internal combustion engine, a motor, and a storage battery and configured to charge the storage battery with electric power generated as a result of regenerative braking and electric power generated by using output of the engine. The control apparatus executes a downhill control which decreases the remaining capacity of the storage battery before the vehicle enters a downhill section and executes a congestion control which increases the remaining capacity before it enters a congestion section. In addition the control apparatus determine which control is to be executed according to the positional relation between the start point of the downhill section and the start point of the congestion section when both a downhill section and a congestion section are contained in a planned travel route of the vehicle.

2 Claims, 17 Drawing Sheets

(51) Int. Cl.
*B60L 7/18* (2006.01)
*B60W 20/12* (2016.01)
*B60W 50/00* (2006.01)
*B60W 10/06* (2006.01)
*B60W 10/08* (2006.01)
*B60W 30/18* (2012.01)

(52) U.S. Cl.
CPC .......... *Y02T 10/6291* (2013.01); *Y10S 903/93* (2013.01); *Y10S 903/947* (2013.01)

(56) References Cited

U.S. PATENT DOCUMENTS

| | | | |
|---|---|---|---|
| 2008/0319596 A1 | 12/2008 | Yamada | |
| 2008/0319597 A1 | 12/2008 | Yamada | |
| 2010/0241297 A1 | 9/2010 | Aoki et al. | |
| 2010/0305799 A1 | 12/2010 | Yamada et al. | |
| 2012/0032637 A1 | 2/2012 | Kotooka et al. | |
| 2013/0015860 A1* | 1/2013 | Crombez | G01R 31/36 324/433 |
| 2013/0296102 A1* | 11/2013 | Banker | B60W 10/196 477/4 |
| 2015/0019057 A1 | 1/2015 | Morisaki et al. | |
| 2016/0167641 A1 | 6/2016 | Yoon | |
| 2016/0368481 A1 | 12/2016 | Nuber et al. | |
| 2017/0021730 A1 | 1/2017 | Ogawa | |
| 2017/0021820 A1 | 1/2017 | Ogawa | |
| 2017/0021823 A1 | 1/2017 | Ogawa | |
| 2017/0028980 A1 | 2/2017 | Ogawa et al. | |
| 2017/0028981 A1 | 2/2017 | Ogawa et al. | |
| 2017/0088117 A1 | 3/2017 | Ogawa | |

FOREIGN PATENT DOCUMENTS

| | | |
|---|---|---|
| JP | 2003-009310 A | 1/2003 |
| JP | 2004-101245 A | 4/2004 |
| JP | 2004248455 A | 9/2004 |
| JP | 2005-160269 A | 6/2005 |
| JP | 2007223404 A | 9/2007 |
| JP | 2009-126450 A | 6/2009 |
| JP | 2010006216 A | 1/2010 |
| JP | 2011-006047 A | 1/2011 |
| JP | 2013119317 A | 6/2013 |
| JP | 2013154715 A | 8/2013 |
| JP | 2013154718 A | 8/2013 |
| JP | 2013154720 A | 8/2013 |
| JP | 2015-019521 A | 1/2015 |

* cited by examiner

FIG.9

| Downhill control | Target SOC* is changed to the low-side capacity Sd, while traveling from Start Point which is shifted back from downhill section start point by Pre-Use distance to downhill section end point. | | |
|---|---|---|---|
| Congestion Control | Target SOC* is changed to High-side capacity Sh, while traveling from Start Point which is shifted back from congestion section start point by Pre-Charge Distance to congestion section start point. | | |

| Condition | Example | Downhill control | Congestion Control |
|---|---|---|---|
| Congestion section start point DJ coincides with Reference point which is shifted forward from downhill section start point DK by Distance Dth3. or Congestion section start point DJ is nearer than Reference point. | Case (a) Congestion section start point DJ is nearer than downhill section start point DK. | | |
| | Case (b) Congestion section start point DJ coincides with downhill section start point DK. | Prohibited (Not executed) | Allowed (Executed) |
| | Case (c) Congestion section start point DJ is farther than downhill section start point DK and Distance between DJ & DK is less than Distance Dth3. | | |
| Congestion section start point DJ is farther than Reference point. | Case (d) Congestion section start point DJ is farther than downhill section start point DK and Distance between DJ & DK is greater than Distance Dth3. | Allowed (Executed) | Prohibited (Not executed) |

HYBRID VEHICLE CONTROL APPARATUS

BACKGROUND OF THE INVENTION

Field of the Invention

The present invention relates to a hybrid vehicle control apparatus a which includes both an internal combustion engine and a motor as drive sources of the vehicle.

Description of the Related Art

There has been known a hybrid vehicle (hereinafter also referred to as the "vehicle" for simplicity) which includes both an internal combustion engine (hereinafter also referred to as the "engine" for simplicity) and a motor as drive sources of the vehicle. Such a vehicle includes a storage battery which supplies electric power to the motor and which is charged by output of the engine.

In addition, when rotation of a wheel axle is transmitted to the motor, the motor generates electric power (i.e., an electric generator generates electric power), and the storage battery is charged by the electric power as well. Namely, the kinetic energy of the vehicle is converted to electrical energy, and the electrical energy is collected by the storage battery. This energy conversion is also called "regeneration." When regeneration is performed, the motor generates a force for braking the vehicle (torque for decreasing the speed of the vehicle). The braking force is also called "regenerative braking force."

The fuel efficiency (fuel consumption rate) of the vehicle can be improved by collecting, by means of regeneration during deceleration, a portion of energy consumed by the engine or the motor during acceleration or constant-speed travel of the vehicle, and storing the collected energy in the storage battery. During travel of the vehicle, the remaining capacity SOC (State of Charge) of the storage battery fluctuates.

Deterioration of the storage battery accelerates as a result of an increase in the remaining capacity SOC when the remaining capacity SOC is high and as a result of a decrease in the remaining capacity SOC when the remaining capacity SOC is low. Therefore, during travel of the vehicle, the control apparatus of the vehicle maintains the remaining capacity SOC at a level between a predetermined remaining capacity upper limit and a predetermined remaining capacity lower limit.

Incidentally, in the case where the vehicle travels in a downhill section, the vehicle continuously accelerates even when neither the engine nor the motor generates torque. Therefore, a driver of the vehicle removes his/her foot from the accelerator pedal and may press down on the brake pedal so as to request the vehicle to produce braking force. At that time, the vehicle restrains an increase in the vehicle speed by means of regenerative braking force and increases the remaining capacity SOC.

When the remaining capacity SOC increases; i.e., when the amount of electric power stored in the storage battery increases, the vehicle can travel over a longer distance by using the output of the motor only without operating the engine. Accordingly, if the remaining capacity SOC can be increased as much as possible within a range below the remaining capacity upper limit when the vehicle travels in a downhill section, the fuel efficiency of the vehicle can be improved further.

However, when the downhill section is long, the remaining capacity SOC reaches the remaining capacity upper limit, which makes it impossible to increase the remaining capacity SOC further. Accordingly, the greater the difference between the remaining capacity upper limit and the remaining capacity SOC at the start point of the downhill section, the greater the effect in improving fuel efficiency attained as a result of the travel in the downhill section.

In view of the foregoing, one conventional drive control apparatus (hereinafter also referred to as the "conventional apparatus") raises the remaining capacity upper limit and lowers the remaining capacity lower limit when a travel route contains a downhill section having a predetermined height difference. In addition, the conventional apparatus puts higher priority to travel by means of the motor than to travel by means of the engine such that the remaining capacity SOC approaches the "lowered remaining capacity lower limit" to the greatest extent possible before the vehicle enters the downhill section (see, for example, Japanese Patent Application Laid-Open (kokai) No. 2005-160269).

Incidentally, in general, when output power of an engine is low, the efficiency of the engine (the ratio of the power to fuel consumption) is low. Accordingly, when a vehicle starts to travel and travels at low speed, a control apparatus for a hybrid vehicle has the engine stop and has a motor generate power only.

Meanwhile, when a vehicle travels a congestion section (a section where traffic congestion is taking place), the vehicle have to repeat travelling and stopping. Accordingly, when a vehicle travels a congestion section, since frequency of travelling by output power of a motor only is increased and amount of electric power collected by regenerative braking is not large, the remaining capacity SOC decreases.

Therefore, in case that the remaining capacity SOC is decreased in advance since travelling of a downhill section is expected, when traffic congestion occurs in the downhill section, the remaining capacity SOC may decrease more and reaches the remaining capacity lower limit. As a result, there is a need to execute "forced charging" to charge the storage battery by the output of the engine, and thereby the fuel efficiency may decrease.

SUMMARY OF THE INVENTION

One object of the present invention is to provide a hybrid vehicle control apparatus which can avoid the decease of the fuel efficiency when a downhill section is contained in a planned travel route and a congestion section is contained in the downhill section.

A hybrid vehicle control apparatus according to the present invention for achieving the above-described object (hereinafter also referred to as the "present invention apparatus") is applied to a hybrid vehicle which includes an internal combustion engine and a motor as drive sources of the vehicle, includes a storage battery for supplying electric power to the motor, and is configured to perform regenerative braking by using the motor, and charge the storage battery with electric power generated as a result of the regenerative braking and electric power generated by using output of the internal combustion engine.

The present invention apparatus comprises a control portion which controls the internal combustion engine and the motor in such a manner that a demanded drive force for the vehicle is satisfied and the remaining capacity of the storage battery approaches a target remaining capacity set to a standard remaining capacity.

The control portion obtains information relevant to a planned travel route of the vehicle and execute downhill control and congestion control.

The downhill control is a control to change the target remaining capacity to a low-side remaining capacity which is less than the standard remaining capacity, in the case where it is judged that a downhill section is contained in the planned travel route on the basis of the information relevant to the planned travel route, when the vehicle travels in a first section (downhill control section) which extends to "the end point of the downhill section" from "a downhill control start point which is shifted back from the start point of the downhill section by a predetermined first distance" contained in the planed travel route, and the first section containing at least a section extending to "the start point of the downhill section" from "the downhill control start point."

The congestion control is a control to change the target remaining capacity to a higher-side remaining capacity which is greater than the standard remaining capacity, in the case where it is judged that a congestion section is contained in the planned travel route on the basis of the information relevant to the planned travel route, when the vehicle travels in a second section (congestion control section) which extends to "the start point of the congestion section" from "a congestion control start point which is shifted back from the start point of the congestion section by a predetermined second distance" contained in the planed travel route.

In addition, when "the downhill section contained in the planned travel route" and "the congestion section contained in the planned travel route" overlap with each other, and a congestion priority condition is satisfied, the control portion is configured to prohibit executing the downhill control according to the downhill section, the congestion priority condition being satisfied in the case where a first condition which is satisfied when "the start oint of the congestion section coincides with the start point of the downhill section" or "the start point of the congestion section is farther from the vehicle than the start point of the downhill section" are satisfied, and a second condition which is satisfied when "the start point of the congestion section coincides with a reference point which is shifted forward from the start point of the downhill section by a third distance which includes zero" or "the start point of the congestion section is nearer to the vehicle than the reference point" are satisfied.

In the case where the third distance is greater than zero, when the start point of the congestion section is contained in the inclusive range from the start point of the downhill section to the reference point (which include the start point of the downhill section and the reference point), the congestion priority condition is satisfied. Meanwhile, in the case where the third distance is zero, when the start point of the congestion section coincides with the start point of the downhill section, the congestion priority condition is satisfied.

When occurrence of decreasing of the remaining capacity SOC due to the travel of the congestion section is expected, the present invention apparatus increases the remaining capacity SOC while the vehicle travels from the congestion control start point to the start point of the congestion section by means of the congestion control. As a result, there is a greater chance to avoid a situation that the remaining capacity SOC reaches the remaining capacity lower limit and thereby the forced charging occurs while the vehicle travels through the congestion section. Namely, although a congestion section in addition to a downhill section is contained in the planed travel route of the vehicle, it is highly possible that the decease of the fuel efficiency is avoided.

In addition, in the case where the downhill section and the congestion section overlap each other, when any one of the following conditions is satisfied, the downhill control is not executed. However, when the third distance is zero, the following condition (c) is omitted.

(a) The start point of the congestion section is nearer to the vehicle than the start point of the downhill section.

(b) The start point of the congestion section coincides with the start point of the downhill section.

(c) The start point of the downhill section is nearer to the vehicle than the start point of the congestion section, and the difference between the start point of the downhill section and the start point of the congestion section is equal to or less than the third distance.

In these cases, the remaining capacity SOC decreases as a result of the travel through the congestion section, and then the remaining capacity SOC increases as a result of the travel through the downhill section. Therefore, it is highly possible that the remaining capacity SOC reaches neither the remaining capacity upper limit nor the remaining capacity lower limit. Namely, it is highly possible that the decease of the fuel efficiency is avoided and the acceleration of the deterioration of the storage battery is suppressed.

In one mode of the present invention apparatus, when the congestion priority condition is satisfied, the control portion executes the congestion control during a travel in a section where the downhill section and the congestion section overlap each other.

According to this mode, since the remaining capacity SOC increases before the travel of the congestion section, it is surely possible to reduce the possibility that the remaining capacity SOC reaches the remaining capacity lower limit.

BRIEF DESCRIPTION OF THE DRAWINGS

FIG. 9 is a table which shows the relation between the relation between the start point of a downhill section and the start point of a congestion section, and executed controls;

DESCRIPTION OF THE PREFERRED EMBODIMENTS

Figure 1:
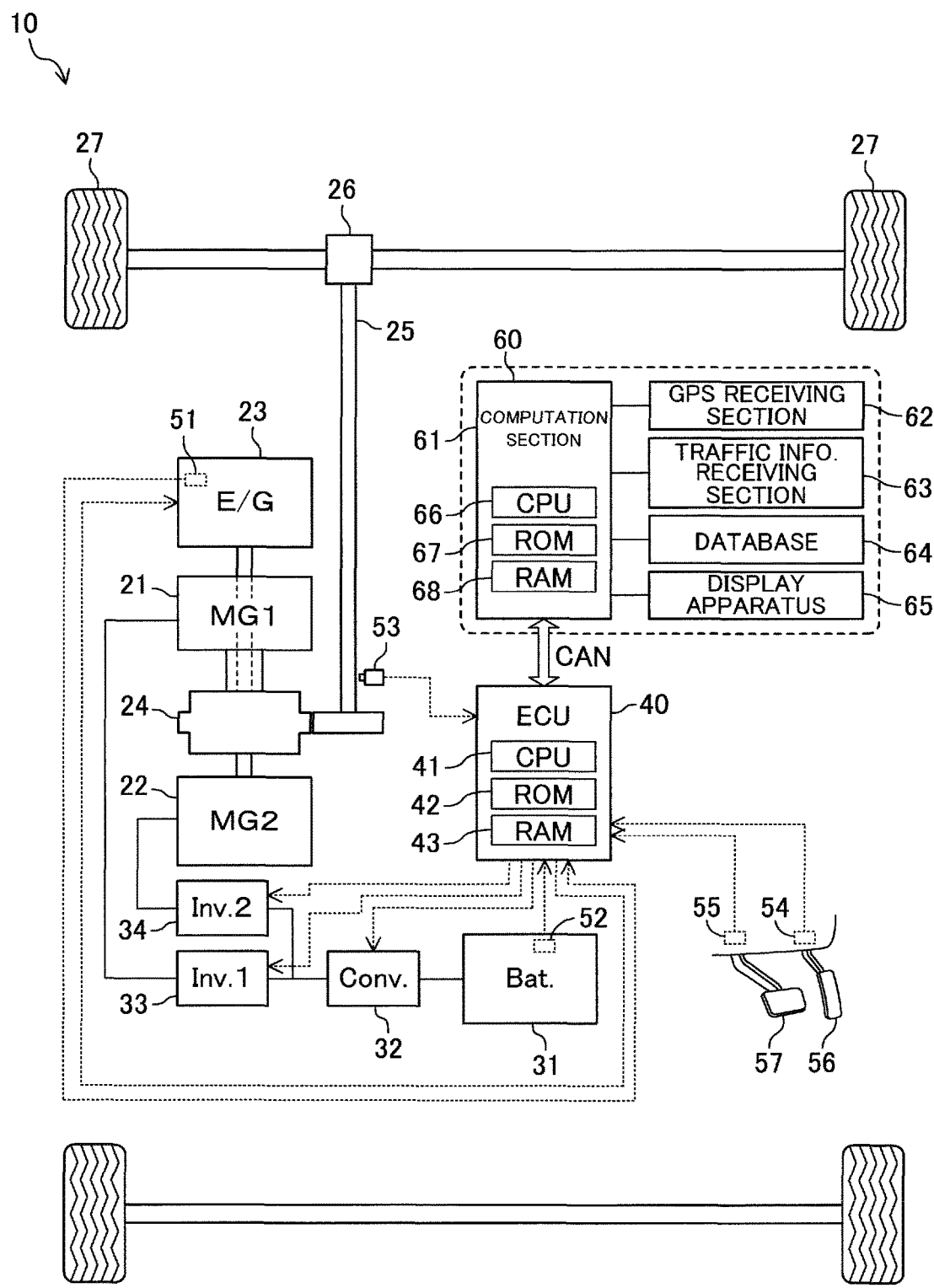
FIG. 1 is a schematic illustration of a vehicle (present vehicle) to which a hybrid vehicle control apparatus (present control apparatus) according to an embodiment of the present invention is applied.

Hybrid vehicle control apparatuses according to an embodiment of the present invention (hereinafter also referred to as the "present control apparatus") will now be described with reference to the drawings. FIG. 1 is a schematic illustration of a vehicle 10 to which the present control apparatus is applied. The vehicle 10 includes a first motor 21, a second motor 22, and an engine 23. Namely, the vehicle 10 is a hybrid vehicle.

Further, the vehicle 10 includes a power split mechanism 24, a storage battery 31, a step-up converter 32, a first inverter 33, a second inverter 34, an ECU (Electric Control Unit) 40, and a travel assisting apparatus 60. The ECU 40 and the travel assisting apparatus 60 constitute the present control apparatus.

Each of the first motor 21 and the second motor 22 includes a stator having three-phase windings (coils) which generate rotating magnetic fields and a rotor having permanent magnets which generate torque by magnetic force between the rotating magnetic fields and the permanent magnets. Each of the first motor 21 and the second motor 22 functions as a generator and a motor.

The first motor 21 is mainly used as a generator. The first motor 21 also cranks the engine 23 when the engine 23 is to be started. The second motor 22 is mainly used as a motor and can generate vehicle drive force (torque for causing the vehicle to travel) for the vehicle 10. The engine 23 can also generate vehicle drive force for the vehicle 10. The engine 23 is a four-cylinder, four-cycle gasoline engine.

The power split mechanism 24 is a planetary gear mechanism. The power split mechanism 24 includes a ring gear, a plurality of power split planetary gears, a plurality of reduction planetary gears, a first sun gear, a second sun gear, a first planetary carrier, and a second planetary carrier (all the components are not shown).

Each of the power split planetary gears and the reduction planetary gears is in meshing engagement with the ring gear. The first sun gear is in meshing engagement with the power split planetary gears. The second sun gear is in meshing engagement with the reduction planetary gears. The first planetary carrier holds the plurality of power split planetary gears in such a manner that the power split planetary gears can rotate about their axes, respectively, and the power split planetary gears can revolve around the first sun gear. The second planetary carrier holds the plurality of reduction planetary gears in such a manner that the reduction planetary gears can rotate about their axes, respectively.

The ring gear is connected to an axle 25 through a counter gear disposed on the outer periphery of the ring gear in such a manner that torque can be transmitted from the ring gear to the axle 25. The output shaft of the engine 23 is coupled to the first planetary carrier in such a manner that torque can be transmitted from the output shaft of the engine 23 to the first planetary carrier. The output shaft of the first motor 21 is coupled to the first sun gear in such a manner that torque can be transmitted from the output shaft of the first motor 21 to the first sun gear. The output shaft of the second motor 22 is coupled to the second sun gear in such a manner that torque can be transmitted from the output shaft of the second motor 22 to the second sun gear.

Figure 2:
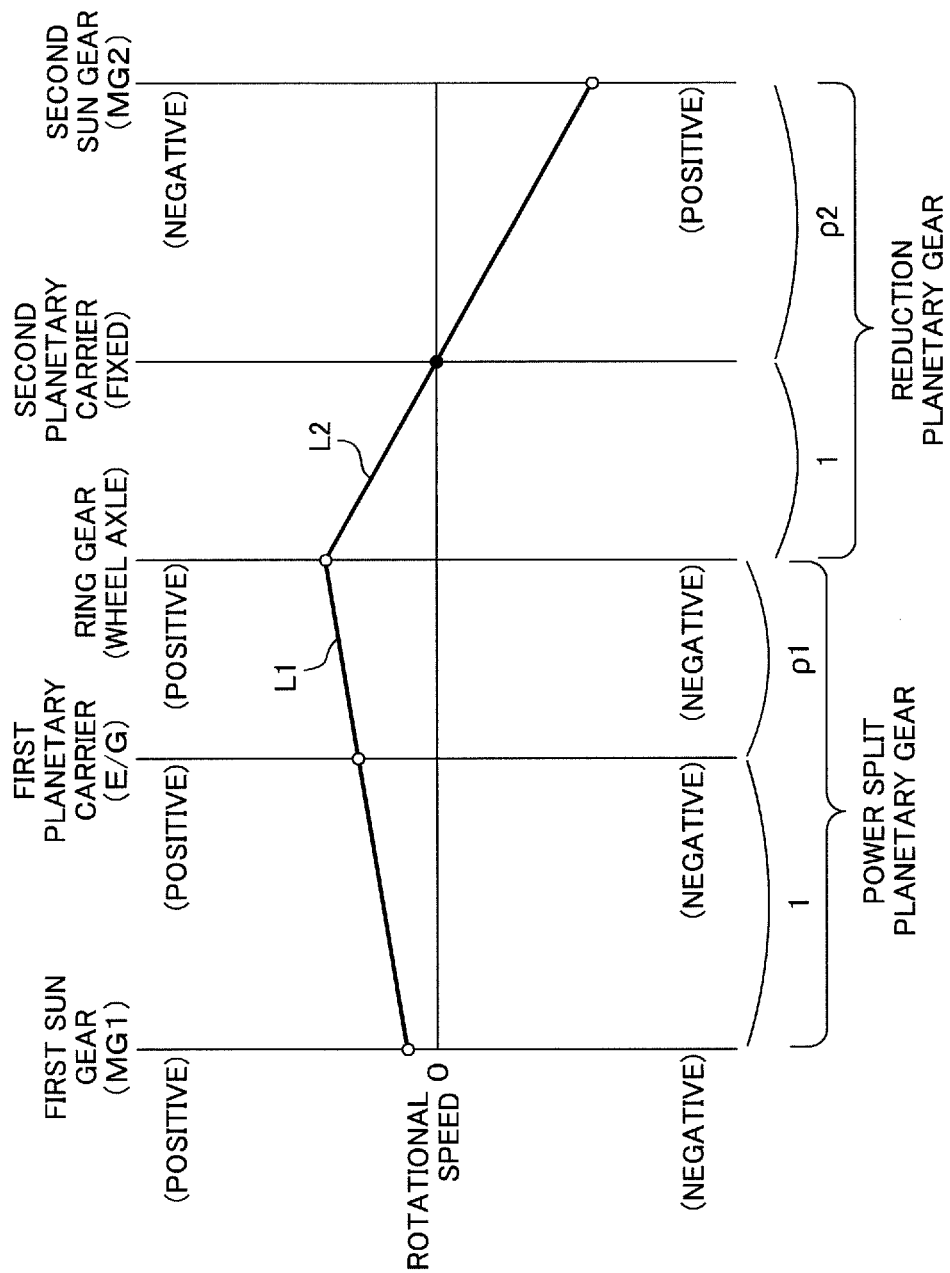
FIG. 2 is an alignment chart which represents the relation among rotational speeds of a first motor, a second motor, an engine, and a ring gear.

The relation among the rotational speed (MG1 rotational speed) Nm1 of the first motor 21, the engine rotational speed NE of the engine 23, and the ring gear rotational speed Nr of the power split mechanism 24, and the relation between the rotational speed (MG2 rotational speed) Nm2 of the second motor 22 and the ring gear rotational speed Nr are represented by a well-known alignment chart shown in FIG. 2. The two straight lines shown in the alignment chart will be also referred to as an operation collinear line L1 and an operation collinear line L2.

According to the operation collinear line L1, the relation between the MG1 rotational speed Nm1, and the engine rotational speed NE and the ring gear rotational speed Nr can be represented by the following expression (1). The gear ratio ρ1 in the expression (1) is the ratio of the number of the teeth of the first sun gear to the number of the teeth of the ring gear (namely, ρ1=the number of the teeth of the first sun gear/the number of the teeth of the ring gear).

$$Nm1=Nr-(Nr-NE)\times(1+\rho1)/\rho1 \quad (1)$$

Meanwhile, according to the operation collinear line L2, the relation between the MG2 rotational speed Nm2 and the ring gear rotational speed Nr can be represented by the following expression (2). The gear ratio ρ2 in the expression (2) is the ratio of the number of the teeth of the second sun gear to the number of the teeth of the ring gear (namely, ρ2=the number of the teeth of the second sun gear/the number of the teeth of the ring gear).

$$Nm2=Nr\times(1+\rho2)/\rho2-Nr \quad (2)$$

Referring back to FIG. 1, the axle 25 is coupled to drive wheels 27 through a differential gear 26 in such a manner that torque can be transmitted from the axle 25 to the drive wheels 27.

The storage battery 31 is a secondary battery (lithium ion battery in the present embodiment) which can be charged and discharged. DC electric power output from the storage battery 31 undergoes voltage conversion (step-up) performed by the step-up converter 32 and becomes high-voltage electric power. The first inverter 33 converts the high-voltage electric power to AC electric power and supplies the AC electric power to the first motor 21. Similarly, the second inverter 34 converts the high-voltage electric power to AC electric power and supplies the AC electric power to the second motor 22.

Meanwhile, when the first motor 21 operates as a generator, the first inverter 33 converts the generated AC electric power to DC electric power and supplies the DC electric power to the step-up converter 32 and/or the second inverter 34. Similarly, when the second motor 22 operates as a generator, the second inverter 34 converts the generated AC electric power to DC electric power and supplies the DC electric power to the step-up converter 32 and/or the first inverter 33. The step-up converter 32 steps down the DC electric power supplied from the first inverter 33 and/or the second inverter 34 and supplies the stepped up DC electric power to the storage battery 31. As a result, the storage battery 31 is charged.

The ECU 40 is a microcomputer which includes a CPU 41, a ROM 42 for storing programs to be executed by the CPU 41, lookup tables (maps), etc., a RAM 43 for temporarily storing data, and other necessary components. The ECU 40 controls the engine 23, the step-up converter 32, the first inverter 33, and the second inverter 34.

The ECU 40 is connected to a crank angle sensor 51, an ammeter 52, a vehicle speed sensor 53, an accelerator operation amount sensor 54, and a brake operation amount sensor 55.

The crank angle sensor 51 measures the rotational position of the crankshaft of the engine 23 and outputs a signal which represents its crank angle CA. The ECU 40 calculates the engine rotational speed NE of the engine 23 on the basis of the crank angle CA. The ammeter 52 outputs a signal which represents current IB flowing through the storage battery 31. The ECU 40 calculates a remaining capacity SOC, which is the amount of electric power charged in the storage battery 31, on the basis of the current IB.

The vehicle speed sensor 53 detects the rotational speed of the axle 25 and outputs a signal which represents the travel speed (vehicle speed) Vs of the vehicle 10. The accelerator operation amount sensor 54 outputs a signal which represents the operation amount (accelerator operation amount) Ap of an accelerator pedal 56. The brake operation amount sensor 55 outputs a signal which represents the operation amount (brake operation amount) Bp of a brake pedal 57.

The travel assisting apparatus 60 includes a computation section 61, a GPS receiving section 62, a traffic information receiving section 63, a database 64, and a display apparatus 65.

The GPS receiving section 62 obtains the present position Pn of the vehicle 10 on the basis of signals (radio waves) from GPS (Global Positioning System) satellites and outputs a signal representing the present position Pn to the computation section 61. The traffic information receiving section 63 receives traffic information relevant to congestions, speed regulations, etc. overlapped on FM multiplexing broadcasting from a road traffic information communication system (VICS for abbreviation) and beacon apparatus of VICS (not shown).

The database 64 is formed by a hard disk drive (HDD) and stores a map database. The map database includes information (map information) regarding "nodes" such as intersections, dead ends, etc., "links" which connect the nodes, and "facilities" such as buildings, parking lots, etc. located along the links. Further, the map database includes pieces of information provided for each link; i.e., the distance of a section (road), the positions of nodes specifying one end (start position) and the other end (end position) of each link, and the average gradient of each link (the ratio of the height difference between the opposite ends of the link to the distance between the opposite ends of the link).

The display apparatus 65 is disposed on a center console (not shown) provided within the compartment of the vehicle 10. The display apparatus 65 has a display and can display the map information stored in the map database, together with the present position Pn, in response to an operation by a driver of the vehicle 10.

The display of the display apparatus 65 also operates as a touch panel. Accordingly, the driver can operate the travel assisting apparatus 60 by touching the display of the display apparatus 65. Further, the display apparatus 65 includes a sound generation unit (not shown). The display apparatus 65 can perform reproduction of a warning beep and announce a message, etc., in accordance with instructions from the computation section 61.

The computation section 61 is a microcomputer which includes a CPU 66, a ROM 67 for storing programs to be executed by the CPU 66, lookup tables (maps), etc., a RAM 68 for temporarily storing data, and other necessary components. The computation section 61 can exchange information with the ECU 40 through a CAN (Controller Area Network). The computation section 61 will be also referred to as the "travel assisting ECU," and the ECU 40 will be also referred to as the "vehicle control ECU."

When the driver of the vehicle 10 enters a destination by using the display apparatus 65, the computation section 61 searches a route (planned travel route) from the present position Pn to the destination on the basis of the map database. The planned travel route is defined by a group of links. The computation section 61 provides a route guidance by using displays on the display apparatus 65 and sounds generated from the sound generation unit such that the driver can pass through the planned travel route.

(Control of Generated Torque by ECU)

Next, operation of the ECU 40 will be described.

When the driver demands the vehicle 10 to generate a drive force (torque), the driver performs an operation for increasing the accelerator operation amount Ap. The ECU 40 determines a demanded ring gear torque Tr*, which is a target value of the torque (ring gear generation torque) Tr acting on the ring gear, on the basis of the accelerator operation amount Ap and the vehicle speed Vs. Since the ring gear generation torque Tr is in proportion to the torque acting on the drive wheels 27, the torque acting on the drive wheels 27 increases as the ring gear generation torque Tr increases.

The ECU 40 controls the engine 23, the step-up converter 32, the first inverter 33, and the second inverter 34 such that the ring gear generation torque Tr becomes equal to the demanded ring gear torque Tr* and the remaining capacity SOC coincides with (approaches) a target remaining capacity SOC*.

For example, in the case where the remaining capacity SOC approximately coincides with the target remaining capacity SOC*, in an operation region within which the operation efficiency of the engine 23 is high, the ECU 40 causes both the engine 23 and the second motor 22 to generate outputs, and causes the first motor 21 to generate electric power by using a portion of the engine output Pe (the output of the engine 23). In this case, the electric power generated by the first motor 21 is supplied to the second motor 22. Accordingly, the remaining capacity SOC is maintained at the target remaining capacity SOC*.

In the case where the remaining capacity SOC is lower than the target remaining capacity SOC*, the ECU 40 increases the engine output Pe to thereby increase the amount of electric power generated by the first motor 21. As a result, the remaining capacity SOC increases.

Meanwhile, when the engine 23 is in an operation region within which the operation efficiency of the engine 23 is low (for example, at the time of start of the vehicle 10 and at the time of low-load travel), the ECU 40 stops the operation of the engine 23 and causes the second motor 22 only to generate an output. In this case, the remaining capacity SOC decreases. However, when the remaining capacity SOC is less than a remaining capacity lower limit Smin, the ECU 40 executes "forced charging" by operating the engine 23 and causing the first motor 21 to generate electric power. As a result, the remaining capacity SOC becomes greater than the remaining capacity lower limit Smin.

In the case where the remaining capacity SOC is greater than a remaining capacity upper limit Smax, even when the engine 23 is in the operation region within which the operation efficiency of the engine 23 is high, the ECU 40 stops the operation of the engine 23 except the case where a large output and a large torque are demanded, and causes the second motor 22 only to generate an output. As a result, the remaining capacity SOC becomes less than the remaining capacity upper limit Smax.

(Control of Braking Force by ECU)

When the driver demands the vehicle 10 to generate a braking force, the driver performs an operation for setting both the accelerator operation amount Ap and the brake operation amount Bp to "0" or an operation for increasing the brake operation amount Bp after setting the accelerator operation amount Ap to "0." When the generation of a braking force is demanded, the ECU 40 generates a regenerative braking force and a frictional braking force. At that time, the regenerative braking force is supplemented by the frictional braking force to generate the demanded braking force.

When the regenerative braking force is to be generated, the ECU 40 causes the first motor 21 and/or the second motor 22 to generate electric power. In other words, the ECU 40 converts the kinetic energy of the vehicle 10 to electrical energy through use of the first motor 21 and/or the second motor 22. The generated electric power is charged in the storage battery 31, whereby the remaining capacity SOC increases.

When the frictional braking force is to be generated, the ECU 40 requests a brake apparatus (not shown) to apply frictional forces to brake discs provided on the wheels of the vehicle 10, including the drive wheels 27. In other words, the ECU 40 converts the kinetic energy of the vehicle 10 to thermal energy through use of the brake apparatus.

The ECU 40 controls the first motor 21, the second motor 22, and the brake apparatus such that the total braking force, which is the sum of the regenerative braking force and the frictional braking force, becomes equal to the braking force demanded by the driver.

(Downhill Control)

In the case where the vehicle 10 travels in a downhill section, if the vehicle 10 generates no braking force, the vehicle speed Vs increases even when no torque is transmitted to the drive wheels 27. When the vehicle speed Vs becomes higher than a speed which the driver expects, the driver demands a braking force. The entirety or a portion of the demanded braking force is provided by the regenerative braking force. Therefore, during the travel in the downhill section, the frequency at which the first motor 21 and/or the second motor 22 generates electric power increases, whereby the remaining capacity SOC increases. In other words, the ECU 40 converts the potential energy of the vehicle 10 to kinetic energy and then to electrical energy.

When the remaining capacity SOC increases, the frequency at which the engine 23 is operated to charge the storage battery 31 decreases, and a portion of the output of the engine 23, which portion is used for charging the storage battery 31, decreases. Therefore, the fuel efficiency of the vehicle 10 improves. However, when the remaining capacity SOC reaches the remaining capacity upper limit Smax in the middle of the downhill section, it becomes impossible to increase the remaining capacity SOC more and improve the fuel efficiency more.

Figure 3:
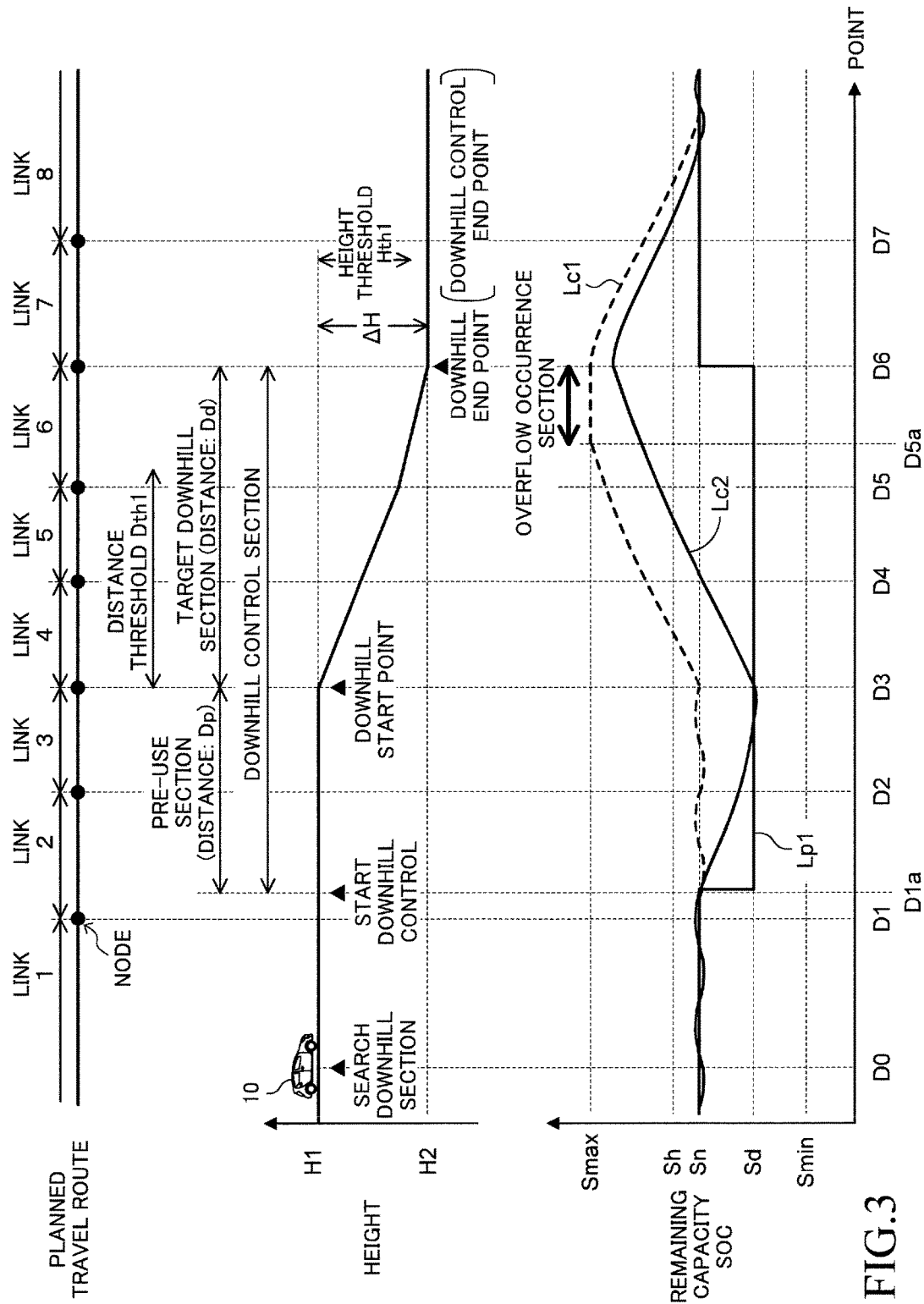
FIG. 3 is a graph which shows a change in remaining capacity when the present vehicle travels through a downhill section.

A change in the remaining capacity SOC at the time when the vehicle 10 travels through a downhill section will be described with reference to FIG. 3. In FIG. 3, the links defining or constituting a planned travel route of the vehicle 10 are denoted as link 1 to link 8 for convenience' sake. The present position Pn is located on link 1. Link 4 to link 6 correspond to a target downhill section which will be described later. Meanwhile, link 1 to link 3, link 7, and link 8 correspond to flat roads. When the downhill control to be described later is not executed, the target remaining capacity SOC* is set to a standard remaining capacity Sn.

A curved line Lc1 (broken line) shows a change in the remaining capacity SOC at the time when the vehicle 10 travels from link 1 to link 8 without executing the downhill control. When the vehicle 10 travels through link 1 to link 3, the operations of the engine 23, the first motor 21, and the second motor 22 are controlled such that the remaining capacity SOC approaches the standard remaining capacity Sn which is the target remaining capacity SOC*. Therefore, the remaining capacity SOC fluctuates near the standard remaining capacity Sn. When the vehicle 10 enters a section corresponding to link 4, the remaining capacity SOC starts to increase due to regenerative braking, and when the vehicle 10 reaches point D5a which is located midway of link 6, the remaining capacity SOC reaches the remaining capacity upper limit Smax.

Therefore, when the vehicle 10 travels between point D5a and point D6, despite the fact that the vehicle 10 travels in a downhill section, the vehicle 10 cannot perform regenerative braking. Therefore, the remaining capacity SOC cannot be increased (namely, overflow occurs), and the fuel efficiency improving effect is not attained sufficiently. In addition, if the time over which the remaining capacity SOC is maintained at a level near the remaining capacity upper limit Smax becomes long, deterioration of the storage battery 31 is accelerated.

In view of this, before the downhill section, the ECU 40 of the vehicle 10 executes "downhill control" of decreasing the target remaining capacity SOC* by a predetermined amount (electric power amount S10). When the downhill control is executed, the target remaining capacity SOC* is set to a remaining capacity (low-side remaining capacity) Sd. In the present embodiment, the magnitude of the difference between the standard remaining capacity Sn and the low-side remaining capacity Sd is equal to the electric power amount S10 which corresponds to 10% the maximum charge amount of the storage battery 31 (namely, the amount of stored electric power at the time when the remaining capacity SOC is 100%) (namely, Sd=Sn−S10).

The downhill control is started when the vehicle 10 reaches point D1a which is shifted back (toward the start point of the planed travel route) from the start point D3 of the downhill section by a predetermined pre-use distance Dp. Meanwhile, the downhill control is ended when the vehicle 10 reaches the end point D6 of the downhill section, and the target remaining capacity SOC* is changed from the low-side remaining capacity Sd to the standard remaining capacity Sn. A change in the target remaining capacity SOC* in the case where the downhill control is executed is shown by a polygonal line Lp1.

A section composed of the downhill section and the "pre-use section" (between the point shifted back from the start point D3 of the downhill section by the predetermined pre-use distance Dp and the start point of the downhill section) will be also referred to as the "downhill control section." The pre-use distance Dp is a distance set in advance and is sufficiently large so that when the vehicle 10 travels over that distance, the remaining capacity SOC is gradually decreased by the electric power amount S10. The point shifted back from the start point of the downhill section by the predetermined pre-use distance Dp is also referred to as a "downhill control start point", for convenience.

A change in the remaining capacity SOC in the case where the downhill control is executed is shown by a curved line Lc2 (continuous line). As can be understood from the curved line Lc2, when the target remaining capacity SOC* is set to the low-side remaining capacity Sd at point D1a, the remaining capacity SOC decreases and reaches a level near the low-side remaining capacity Sd. When the vehicle 10 travels through the downhill section after that, the remaining capacity SOC increases. However, the vehicle 10 ends the travel through the downhill section before the remaining capacity SOC reaches the remaining capacity upper limit Smax. Namely, as a result of the downhill control, occurrence of the above-described overflow can be avoided.

When the vehicle 10 reaches the start point of the downhill control section (point D1a), the ECU 40 receives a notice which indicates that the downhill control must be started, from the travel assisting apparatus 60 (specifically, the computation section 61). The processing which the computation section 61 executes will be described later. Similarly, the vehicle 10 reaches the end point of the downhill control section (point D6), ECU 40 receives a notice which indicates that the downhill control must be stopped, from the computation section 61. The ECU 40 starts the downhill control, and then stops the downhill control, according to the notices receiving from the computation section 61.

The downhill section which is the target of the downhill control (target downhill section) is a downhill section in which an increase in the remaining capacity SOC due to the above-described conversion of potential energy to electrical energy is expected to become greater than an "electric power amount S20 corresponding to 20% the maximum charge amount of the storage battery 31." In the present embodiment, the target downhill section is a downhill section where a distance between the start point and the end point is greater than a distance threshold Dth1, and where the height of the end point is lower than the height of the start point and the height difference is greater than a height difference threshold Hth.

In the example of FIG. 3, the distance of a downhill section constituted by link 4 to link 6 (namely, a section from point D3 to point D6) is Dd and the distance Dd is greater than the distance threshold Dth1 (namely, Dd>Dth1). In addition, the height of the start point of the downhill section (namely, the start point D3 of link 4) is H1, the height of the end point (namely, the end point D6 of link 6) is H2 and the height deference ΔH between H1 and H2 is greater than the height threshold Hth (namely, ΔH=H1−H2>Hth). Accordingly, the downhill section constituted by link 4 to link 6 is therefore a target downhill section.

Notably, as described above, the length and gradient of each link are stored in the map database. Therefore, the computation section 61 obtains the height difference between one end and the other end of each link by calculating the product of the length and gradient of the link. Further, the computation section 61 obtains the height difference between one end and the other end of a certain section by calculating the sum of the height differences of a plurality of links which constitute the certain section. Notably, in the case where the map database contains the heights of opposite ends of each link, the height difference of each link is obtained by subtracting the height of the start point of the link from the height of the end point of the link.

(Congestion Control)

When the vehicle 10 travels in a congestion section, the vehicle speed Vs becomes lower as compared with the case where the congestion does not occur. Alternatively, when the vehicle 10 travels in a congestion section, stopped states (states where Vs=0) and traveling states (states where Vs>0) alternately occur.

As described above, at the time of start of the vehicle 10 and at the time of low-load travel, the ECU 40 stops the operation of the engine 23 and causes the second motor 22 only to generate an output. Meanwhile, during traveling a congestion section, although the vehicle 10 decelerates and stops frequently (namely, regenerative braking is performed frequently), since the vehicle speed Vs at the time of start of regenerative braking is low, the amount of electric power obtained by the regenerative braking becomes low. Therefore, when the vehicle 10 travels in a congestion section, the remaining capacity SOC decreases.

Figure 4:
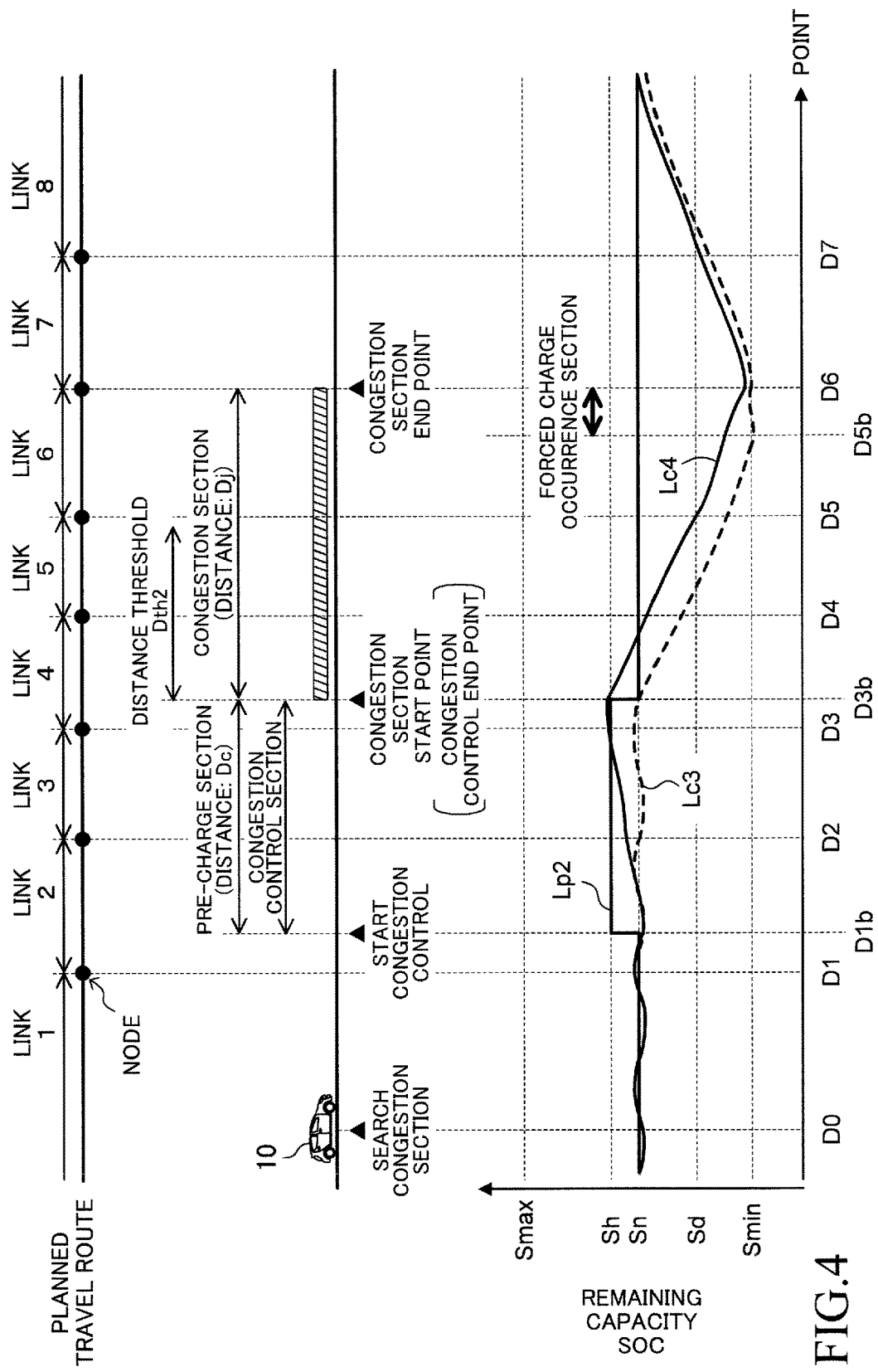
FIG. 4 is a graph which shows a change in remaining capacity when the present vehicle travels through a congestion section.

A change in the remaining capacity SOC at the time when the vehicle 10 travels through a congestion section will be described with reference to FIG. 4. In FIG. 4, the planned travel route of the vehicle 10 is denoted as link 1 to link 8 and each of links is flat. Congestion occurs in a section from point D3B to point D6. When the above-described downhill control and the congestion control to be described later is not executed, the target remaining capacity SOC* is set to a standard remaining capacity Sn.

A curved line Lc3 (broken line) shows a change in the remaining capacity SOC at the time when the vehicle 10 travels from link 1 to link 8 without executing the congestion control. The remaining capacity SOC fluctuates near the standard remaining capacity Sn until the vehicle 10 reaches the start point of the congestion section. When the vehicle 10 reaches point D3b and goes into the congestion section, the remaining capacity SOC starts to decrease. When the vehicle 10 reaches point D5b which is located midway of the congestion section, the remaining capacity SOC reaches the remaining capacity lower limit Smin.

As a result, the ECU 40 executes the forced charging, and then the fuel efficiency of the vehicle 10 decreases. In addition, the remaining capacity SOC continues to be a level near the remaining capacity lower limit Smin, and then deterioration of the storage battery 31 accelerates.

In view of this, before the congestion section, the ECU 40 executes the "congestion control" of increasing the target remaining capacity SOC* by a predetermined amount (electric power amount S05). Namely, when the congestion control is executed, the target remaining capacity SOC* is set to a remaining capacity (high-side remaining capacity) Sh. In the present embodiment, the magnitude of the difference between the standard remaining capacity Sn and the high-side remaining capacity Sh is equal to the electric power amount S05 which corresponds to 5% the maximum charge amount of the storage battery 31 (namely, the amount of stored electric power at the time when the remaining capacity SOC is 100%) (namely, Sh=Sn+S05).

The congestion control is started when the vehicle 10 reaches point D1b which is shifted back (toward the start point of the planed travel route) from the start point D3b of the congestion section by a predetermined pre-charge distance Dc. Meanwhile, the congestion control is ended when the vehicle 10 reaches the start point D3b of the congestion section, and the target remaining capacity SOC* is changed from the high-side remaining capacity Sh to the standard remaining capacity Sn. A change in the target remaining capacity SOC* in the case where the congestion control is executed is shown by a polygonal line Lp2.

The section between the point shifted back from the start point D3b of the congestion section by the predetermined pre-charge distance Dc and the start point of the congestion section will be also referred to as the "pre-charge section" and the "congestion control section." The pre-charge distance Dc is a distance set in advance and is sufficiently large so that when the vehicle 10 travels over that distance, the remaining capacity SOC is increased by the electric power amount S05.

A change in the remaining capacity SOC in the case where the congestion control is executed is shown by a curved line Lc4 (continuous line). As can be understood from the curved line Lc4, when the target remaining capacity SOC* is set to the high-side remaining capacity Sh at point D1b, the remaining capacity SOC increases and reaches a level near the high-side remaining capacity Sh. When the vehicle 10 travels through the congestion section after that, the remaining capacity SOC decreases. However, the vehicle 10 ends the travel through the congestion section before the remaining capacity SOC reaches the remaining capacity lower limit Smin. Namely, as a result of the congestion control, execution of the forced charging can be avoided.

When the vehicle 10 reaches the start point of the congestion control section (point D1b), the ECU 40 receives a notice which indicates that the congestion control must be started, from the travel assisting apparatus 60 (specifically, the computation section 61). The processing which the computation section 61 executes will be described later. Similarly, the vehicle 10 reaches the start point of the congestion section (point D3b), ECU 40 receives a notice which indicates that the congestion control must be stopped, from the computation section 61. The ECU 40 starts the congestion control, and then stops the congestion control, according to the notices receiving from the computation section 61.

The congestion section which is the target of the congestion control (target congestion section) is a congestion section in which an decrease in the remaining capacity SOC is expected to become greater than the electric power amount S20. In the present embodiment, the target congestion section is a congestion section where a distance between the start point and the end point is greater than a distance threshold Dth2.

In the example of FIG. 4, the section between point D3b and point D6 is a congestion section and the distance of the congestion section is Dj. The distance Dj is greater than the distance threshold Dth2 (namely, Dj>Dth2). Accordingly, this congestion section is therefore a target congestion section.

(Provision of Information from Travel Assisting Apparatus to ECU)

The computation section 61 searches target downhill sections and target congestion sections contained in a route from the present position Pn to a destination (namely, a planned travel route). In the case where a target downhill section is found, when the vehicle 10 reaches the start point of the downhill control section (the start point of the pre-use section), the computation section 61 sends to the ECU 40 a notice which indicates that the downhill control must be started. In addition, when the vehicle 10 reaches the end point of the downhill control section (the end point of the target downhill section), the computation section 61 sends to the ECU 40 a notice which indicates that the downhill control must be stopped.

Meanwhile, in the case where a target congestion section is found, when the vehicle 10 reaches the start point of the congestion control section (the start point of the pre-charge section), the computation section 61 sends to the ECU 40 a notice which indicates that the congestion control must be started. In addition, when the vehicle 10 reaches the end point of the congestion control section (the end point of the pre-charge section), the computation section 61 sends to the ECU 40 a notice which indicates that the congestion control must be stopped.

(Coordination Between Downhill Control and Congestion Control)

Incidentally, there can be cases where a downhill control section and a congestion control section overlap with each other on the actual planed travel route. In these cases, the ECU 40 executes either of the downhill control and the congestion control. Hereinafter, the coordination between the downhill control and the congestion control will be described with classification.

Figure 5:
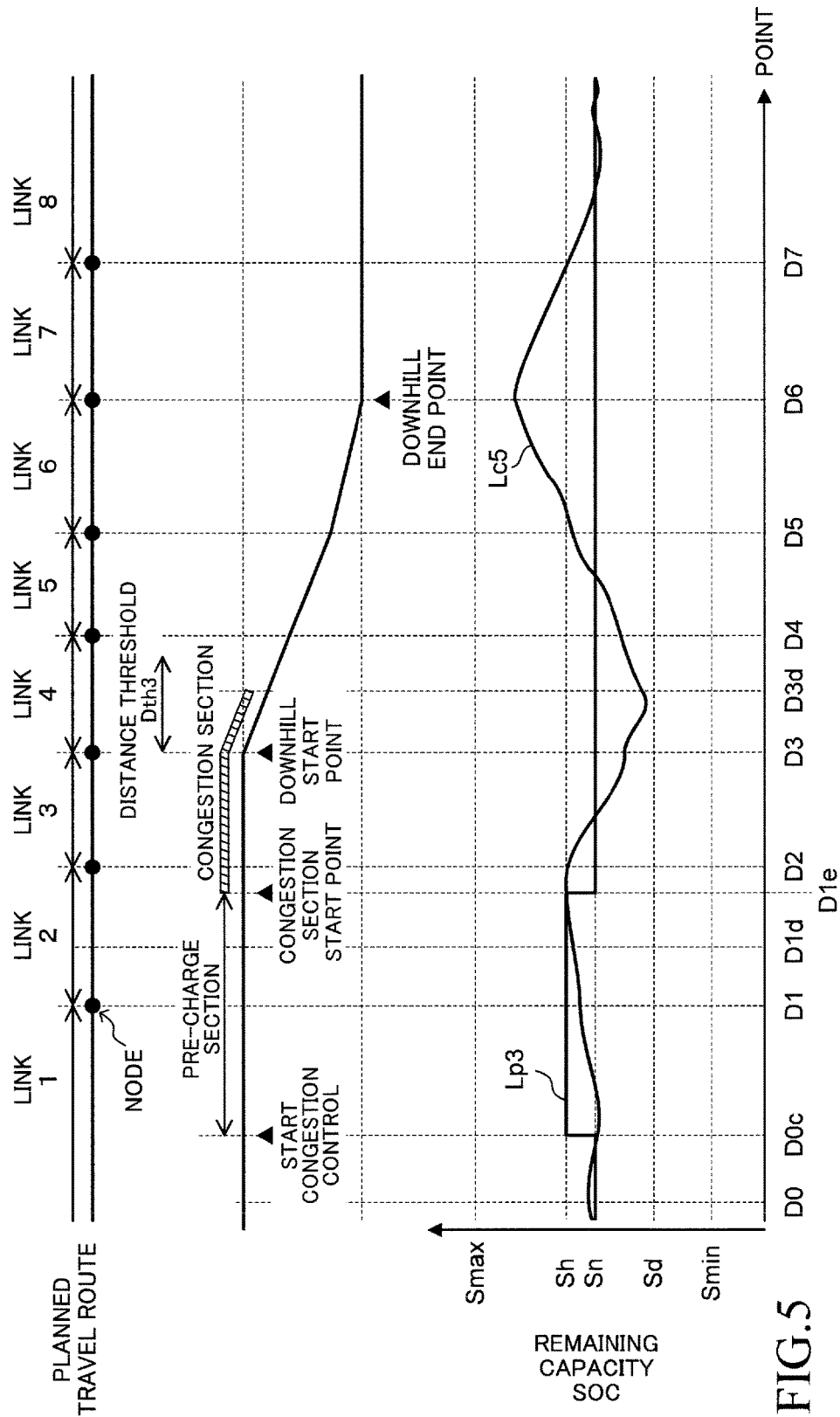
FIG. 5 is a graph which shows a change in remaining capacity when a downhill section and a congestion section are present.

(A) In the case where the start point of the congestion section is nearer than the start point of the downhill section In this case, the ECU 40 executes the congestion control but does not execute the downhill control. An example of this case is shown in the case (a) in FIG. 5. A change in the target remaining capacity SOC* in the case where the congestion control is executed is shown by a polygonal line Lp3. Similarly, a change in the remaining capacity SOC is shown by a curved line Lc5.

As can be understood from the polygonal line Lp3 and the curved line Lc5, when the vehicle 10 reaches point D0c which is the start point of the congestion control section, the congestion control is started and the target remaining capacity SOC* is changed to the high-side remaining capacity Sh. As a result, the remaining capacity SOC increases and reaches a level near the high-side remaining capacity Sh. After that, when the vehicle 10 reaches point D1e which is the start point of the congestion section, the target remaining capacity SOC* is changed back to the standard remaining capacity Sn and the remaining capacity SOC starts to decrease. Further, when the vehicle 10 reaches point D3d which is the end point of the congestion section via point D3 which is the start point of the downhill section, the remaining capacity SOC starts to increase.

In this case, although the downhill control is not executed, since the vehicle 10 goes into the target downhill section after the remaining capacity SOC decreases due to the traveling of the target congestion section, the remaining capacity SOC reaches neither the remaining capacity upper limit Smax nor the remaining capacity lower limit Smin. Namely, the above-described overflow and forced charging do not occur.

(B) In the case where the start point of the downhill section coincides with the start point of the congestion section, or the start point of the downhill section is nearer to the vehicle 10 than the start point of the congestion section and the difference between these start points is less than or equal to a distance threshold Dth3

Figure 6:
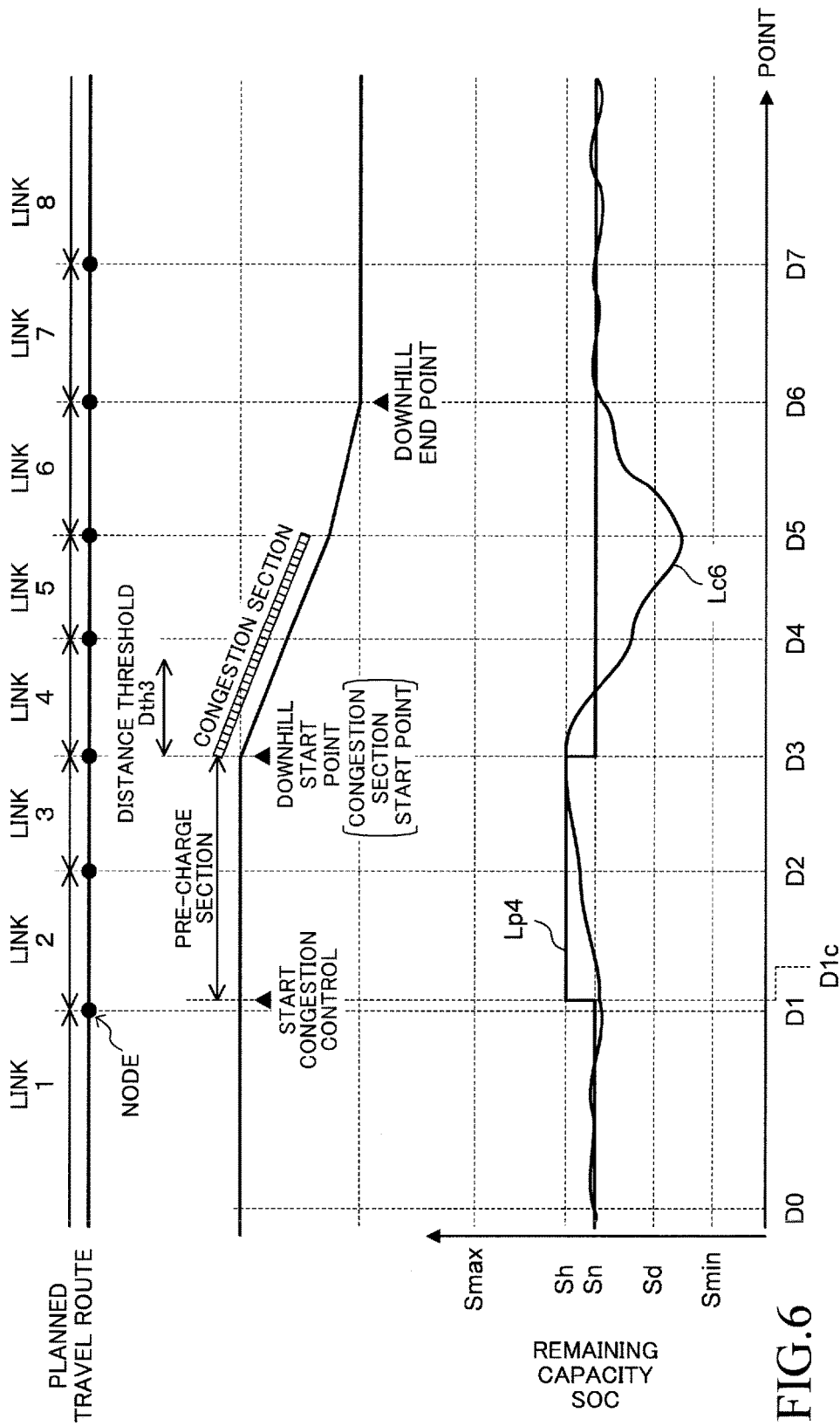
FIG. 6 is a graph which shows a change in remaining capacity when a downhill section and a congestion section are present.

In these case, the ECU 40 executes the congestion control but does not execute the downhill control. An example of the case where the start point of the downhill section coincides with the start point of the congestion section is shown in the case (b) in FIG. 6. A change in the target remaining capacity SOC* in the case where the congestion control is executed is shown by a polygonal line Lp4. Similarly, a change in the remaining capacity SOC is shown by a curved line Lc6.

As can be understood from the polygonal line Lp4 and the curved line Lc6, when the vehicle 10 reaches point D1c which is the start point of the congestion control, the congestion control is started and the target remaining capacity SOC* is changed to the high-side remaining capacity Sh. As a result, the remaining capacity SOC increases and reaches a level near the high-side remaining capacity Sh. After that, when the vehicle 10 reaches point D3 which is the start point of the downhill section (and is also the start point of the congestion section), the target remaining capacity SOC* is changed back to the standard remaining capacity Sn and the remaining capacity SOC starts to decrease. After the vehicle 10 reaches point D5 which is the end point of the congestion section, the remaining capacity SOC increases until the vehicle 10 reaches point D6 which is the end point of the downhill section.

Figure 7:
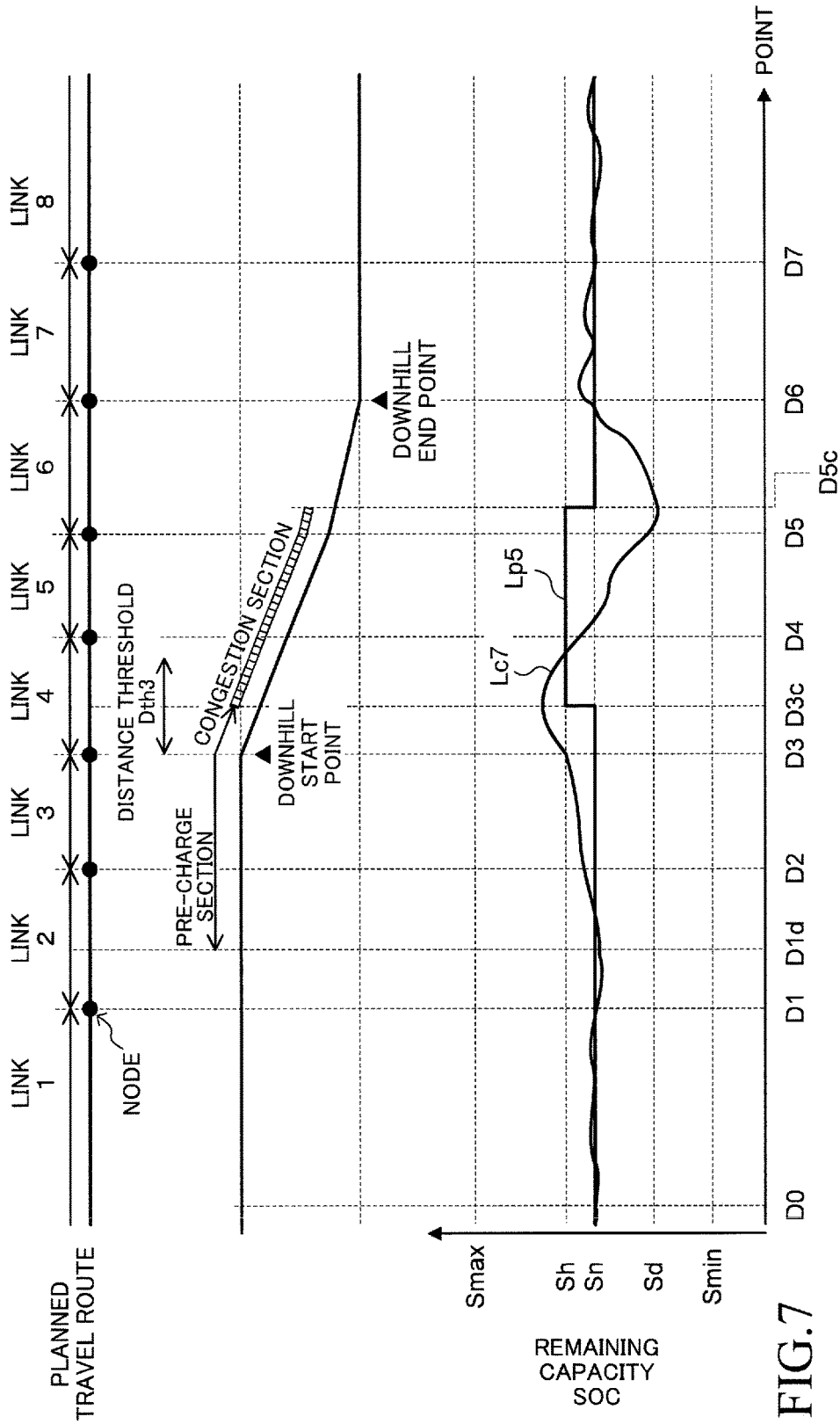
FIG. 7 is a graph which shows a change in remaining capacity when a downhill section and a congestion section are present.

Further, an example of the case where the start point of the downhill section is nearer to the vehicle 10 than the start point of the congestion section and the difference between these start points is less than or equal to the distance threshold Dth3 is shown in the case (c) in FIG. 7. A change in the target remaining capacity SOC* in the case where the congestion control is executed is shown by a polygonal line Lp5. Similarly, a change in the remaining capacity SOC is shown by a curved line Lc7.

As can be understood from the polygonal line Lp5 and the curved line Lc7, when the vehicle 10 reaches point D1d which is the start point of the congestion control, the congestion control is started and the target remaining capacity SOC* is changed to the high-side remaining capacity Sh. As a result, the remaining capacity SOC starts to increase. And then, when the vehicle 10 reaches point D3 which is the start point of the downhill section, there is an increase in the increasing rate of the remaining capacity SOC. After that, when the vehicle 10 reaches point D3c which is the start point of the congestion section, the target remaining capacity SOC* is changed back to the standard remaining capacity Sn. As a result, the remaining capacity SOC decreases until the vehicle 10 reaches the point D5c which is the end point of the congestion section. When the vehicle 10 travels from the end point of the congestion section (point D5c) to point D6 which is the end point of the downhill section, the remaining capacity SOC increases.

In the case (b) and the case (c), although the downhill control is not executed, since the remaining capacity SOC increases due to the travel through the downhill section after the remaining capacity SOC decreases due to the travel through the congestion section, the remaining capacity SOC reaches neither the remaining capacity upper limit Smax nor the remaining capacity lower limit Smin. Namely, the above-described overflow and forced charging do not occur.

However, according to the difference between the distance of the downhill section and the distance of the congestion section, and the gradient of the downhill section, although the congestion control is executed, there may be cases where the remaining capacity SOC reaches the remaining capacity upper limit Smax while the vehicle 10 travels through the downhill section in which congestion down not occur. In such cases, the fuel efficiency improving effect may not be obtained to a sufficient degree.

Meanwhile, when the remaining capacity SOC reaches the remaining capacity lower limit Smin due to executing the downhill control, the forced charging occurs and the fuel efficiency decreases surely. In view of this, in the case where the start point of the downhill section is nearer to the vehicle 10 than the start point of the congestion section and the difference between these start points is less than or equal to the distance threshold Dth3, as well as the case where the start point of the congestion section is nearer than the start point of the downhill section (the above-described case (A)), the congestion control is executed as described above.

(C) In the case where the start point of the downhill section is nearer to the vehicle 10 than the start point of the congestion section and the difference between these start points is greater than the distance threshold Dth3

Figure 8:
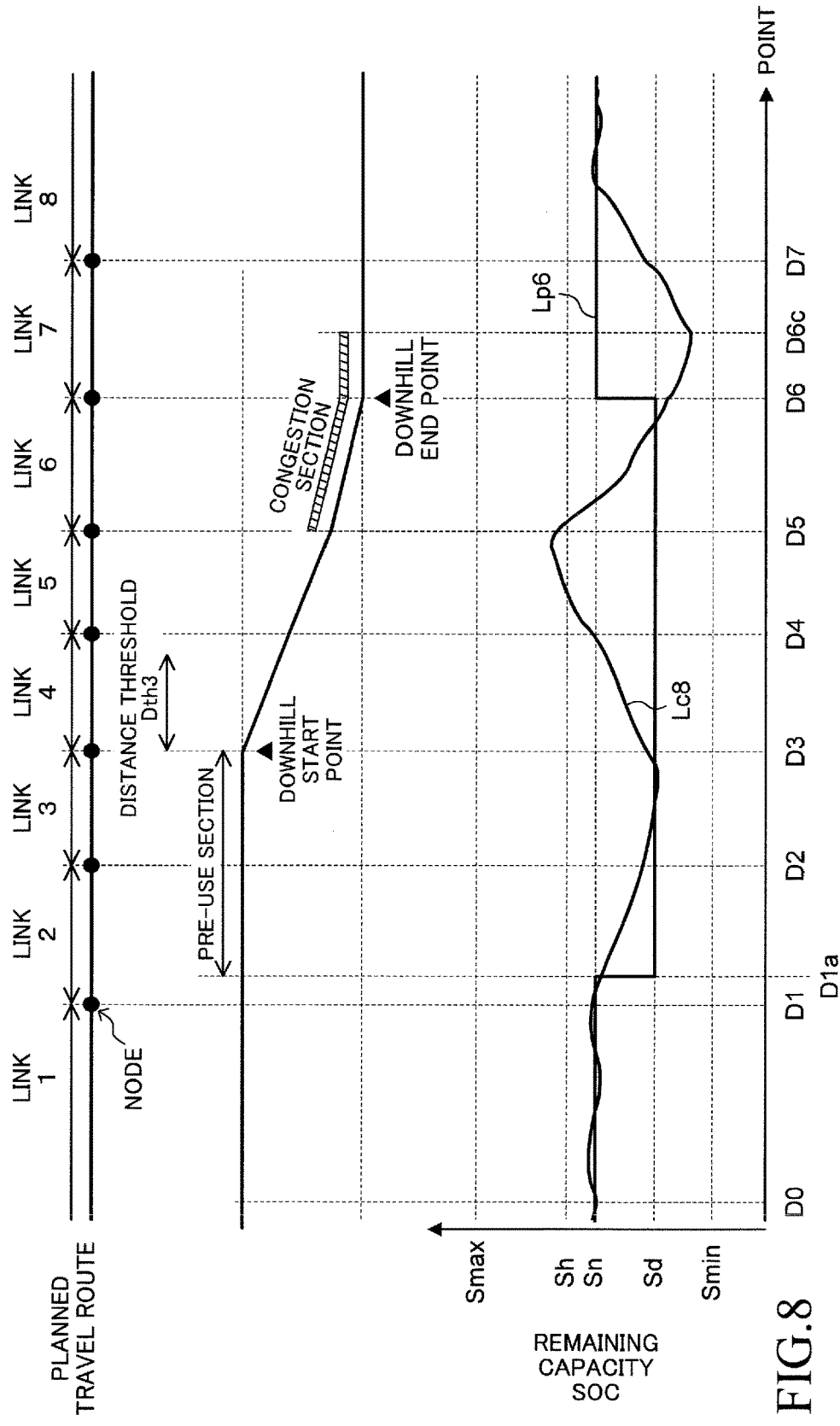
FIG. 8 is a graph which shows a change in remaining capacity when a downhill section and a congestion section are present.

In this case, the ECU 40 executes the downhill control but does not execute the congestion control. An example of this case is shown in the case (d) in FIG. 8. A change in the target remaining capacity SOC* in the case where the downhill control is executed is shown by a polygonal line Lp6. Similarly, a change in the remaining capacity SOC is shown by a curved line Lc8.

As can be understood from the polygonal line Lp6 and the curved line Lc8, when the vehicle 10 reaches point D1a which is the start point of the downhill control, the downhill control is started and the target remaining capacity SOC* is changed to the low-side remaining capacity Sd. As a result, the remaining capacity SOC decreases. After that, when the vehicle 10 reaches point D3 which is the start point of the downhill section, the target remaining capacity SOC* is changed back to the standard remaining capacity Sn and the remaining capacity SOC starts to increase. Further, when the vehicle 10 travels from point D5 which is the start point of the congestion section to point D6c which is the end point of the congestion section, the remaining capacity SOC decreases.

In this case, although the congestion control is not executed, since the vehicle 10 goes into the congestion section after the remaining capacity SOC increases due to the traveling of the downhill section, the remaining capacity SOC reaches neither the remaining capacity upper limit Smax nor the remaining capacity lower limit Smin. Namely, the above-described overflow and forced charging do not occur.

The distance threshold Dth3 is a distance set in advance and is sufficiently large so that when the vehicle 10 travels through a downhill section with that distance, the remaining capacity SOC is increased by the electric power amount S05.

FIG. 9 shows a summary of the above-described cases.

Notably, the distance threshold Dth3 can be zero. In this case, when the start point of the downhill section coincides with the start point of the congestion section (for example, in the above-described case (b)), the congestion control is executed. Meanwhile, the start point of the downhill section is nearer to the vehicle 10 than the start point of the congestion section (for example, in the above-described case (c)), the downhill control is executed.

(Specific Operation—Control of Drive Force by ECU)

Next, specific operation of the ECU 40 will be described.

Figure 10:
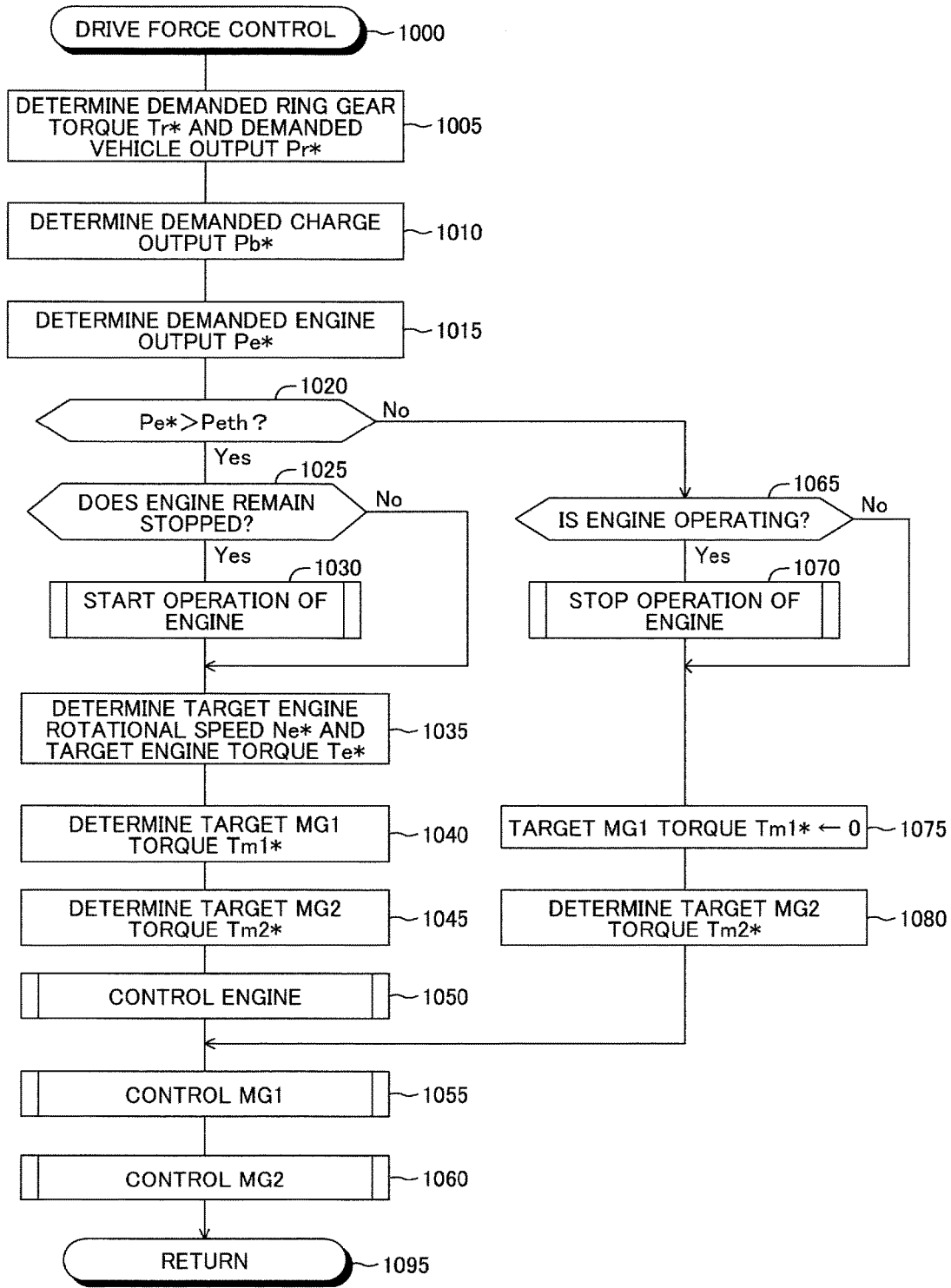
FIG. 10 is a flowchart showing drive force control processing executed by the present control apparatus.

The CPU 41 of the ECU 40 (hereinafter also referred to as the "CPU" for simplicity) executes the "drive force control routine" represented by the flowchart of FIG. 10 every time a predetermined period of time elapses. Accordingly, when a proper timing comes, the CPU starts the processing from step 1000 of FIG. 10, successively performs the processings of step 1005 to step 1015 which will be described later, and proceeds to step 1020.

Figure 11:
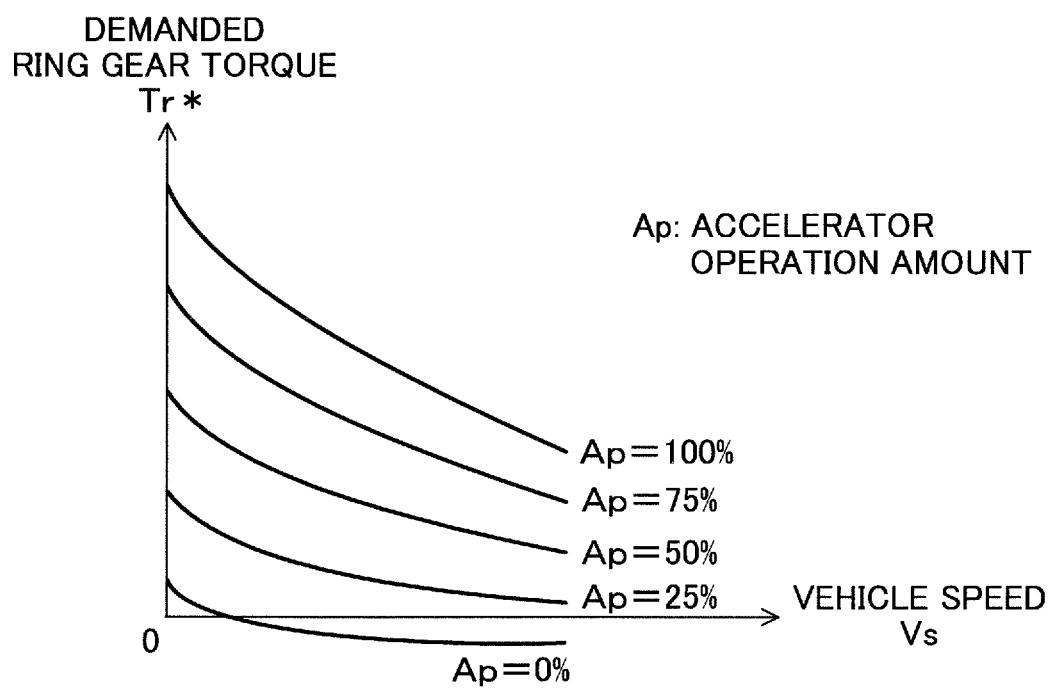
FIG. 11 is a graph showing the relation between vehicle speed and accelerator operation amount, and demanded ring gear torque.

Step 1005: The CPU determines a demanded ring gear torque Tr* by applying the accelerator operation amount Ap and the vehicle speed Vs to a "lookup table which defines the relation between the accelerator operation amount Ap and the vehicle speed Vs, and the demanded ring gear torque Tr*" shown in FIG. 11, which is stored in the ROM 42 in a form of a lookup table.

The demanded ring gear torque Tr* is proportional to the torque acting on the drive wheels 27 which the driver requests the vehicle 10 to produce.

Further, the CPU calculates, as a demanded vehicle output Pr*, the product of the demanded ring gear torque Tr* and the ring gear rotational speed Nr (Pr*=Tr*×Nr). The ring gear rotational speed Nr is proportional to the vehicle speed Vs.

Step 1010: The CPU determines a demanded charge output Pb* on the basis of a remaining capacity difference ΔSOC which is the difference between the target remaining capacity SOC* and the actual remaining capacity SOC calculated separately (i.e., ΔSOC=SOC−SOC*). More specifically, the CPU determines the demanded charge output Pb* by applying the remaining capacity difference ΔSOC to a "lookup table which defines the relation between the remaining capacity difference ΔSOC and the demanded charge output Pb*" shown in FIG. 12, which is stored in the ROM 42 in a form of a lookup table.

Figure 12:
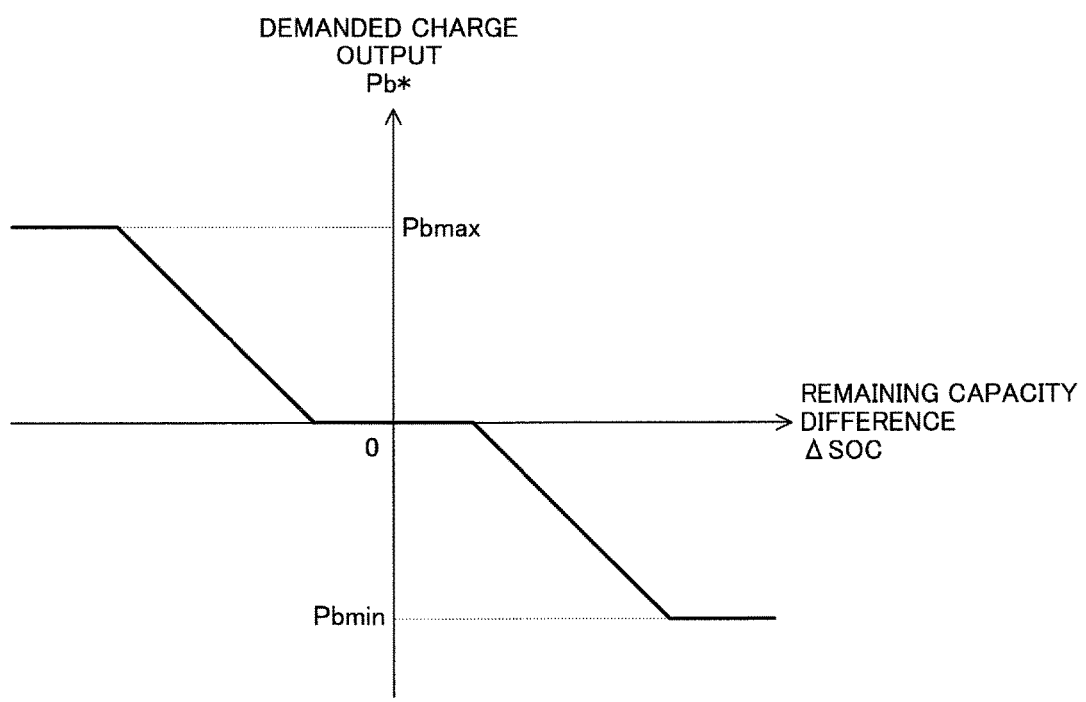
FIG. 12 is a graph showing the relation between remaining capacity difference and demanded charge output.

As can be understood from FIG. 12, the greater the remaining capacity difference ΔSOC, the smaller the value to which the demanded charge output Pb* is set. Accordingly, in the case where the actual remaining capacity SOC is at a certain level, when the target remaining capacity SOC* is decreased, the remaining capacity difference ΔSOC increases, whereby the demanded charge output Pb* decreases. The upper limit of the demanded charge output Pb* is Pbmax (Pbmax>0), and the lower limit of the set demanded charge output Pb* is Pbmin (Pbmin<0). Notably, irrespective of whether or not the downhill control and the congestion control is executed and irrespective of the value of the remaining capacity difference ΔSOC, the demanded charge output Pb* is set to the lower limit Pbmin when the remaining capacity SOC is equal to or greater than the remaining capacity upper limit Smax, and the demanded charge output Pb* is set to the upper limit Pbmax when the remaining capacity SOC is equal to or less than the remaining capacity lower limit Smin.

Step 1015: The CPU calculates a demanded engine output Pe* by adding a loss Ploss to the sum of the demanded vehicle output Pr* and the demanded charge output Pb* (i.e., Pe*=Pr*+Pb*+Ploss).

Next, the CPU proceeds to step 1020 and judges whether or not the demanded engine output Pe* is greater than an output threshold Peth. The output threshold Peth is set to a value determined such that when the engine 23 is operated to produce an output equal to or less than the output threshold Peth, the operation efficiency of the engine 23 becomes lower than a predetermined efficiency. In addition, the output threshold Peth is set such that when the demanded charge output Pb* is set to the upper limit Pbmax, the demanded engine output Pe* becomes greater than the output threshold Peth.

(Case 1: Pe*>Peth)

In the case where the demanded engine output Pe* is greater than the output threshold Peth, the CPU makes an affirmative judgment (Yes) in step 1020 and proceeds to step 1025. In step 1025, the CPU judges whether or not the engine 23 is in a stopped state at the present. In the case where the engine 23 is in the stopped state, the CPU makes an affirmative judgment (Yes) in step 1025 and proceeds to step 1030. In step 1030, the CPU executes processing of starting the operation of the engine 23. Subsequently, the CPU proceeds to step 1035. Meanwhile, in the case where the engine 23 is being operated, the CPU makes a negative judgment (No) in step 1025 and proceeds directly to step 1035.

The CPU successively performs the processings of step 1035 to step 1060 which will be described later. After that, the CPU proceeds to step 1095 and ends the present routine temporarily.

Step 1035: The CPU determines a target engine rotational speed Ne* and a target engine torque Te* such that an output equal to the demanded engine output Pe* is output from the engine 23 and the operation efficiency of the engine 23 becomes the highest. Namely, the CPU determines the target engine rotational speed Ne* and the target engine torque Te* on the basis of the optimum engine operation point corresponding to the demanded engine output Pe*.

Step 1040: The CPU calculates a target MG1 rotational speed Nm1* by substituting the ring gear rotational speed Nr and the target engine rotational speed Ne* into the above-described expression (1). Further, the CPU determines a target first motor torque (target MG1 torque) Tm1* which realizes the target MG1 rotational speed Nm1*.

Step 1045: The CPU calculates a shortage torque which is the difference between the demanded ring gear torque Tr* and a torque which acts on the ring gear when the engine 23 generates a torque equal to the target engine torque Te*. Further, the CPU calculates a target second motor torque (target MG2 torque) Tm2* which is a torque to be generated by the second motor 22 so as to supplement the shortage torque.

Step 1050: The CPU controls the engine 23 in such a manner that the engine torque Te generated by the engine 23 becomes equal to the target engine torque Te* and the engine rotational speed NE becomes equal to the target engine rotational speed Ne*.

Step 1055: The CPU controls the first inverter 33 in such a manner that the torque Tm1 generated by the first motor 21 becomes equal to the target MG1 torque Tm1*.

Step 1060: The CPU controls the second inverter 34 in such a manner that the torque Tm2 generated by the second motor 22 becomes equal to the target MG2 torque Tm2*.

(Case 2: Pe*≤Peth)

In the case where the demanded engine output Pe* is equal to or less than the output threshold Peth, when the CPU proceeds to step 1020, the CPU makes a negative judgment (No) in step 1020 and proceeds to step 1065 so as to judge whether or not the engine 23 is being operated at the present.

In the case where the engine 23 is being operated, the CPU makes an affirmative judgment (Yes) in step 1065 and proceeds to step 1070 so as to execute processing of stopping the operation of the engine 23. After that, the CPU proceeds to step 1075. Meanwhile, in the case where the engine 23 is in the stopped state, the CPU makes a negative judgment (No) in step 1065 and proceeds directly to step 1075.

In step 1075, the CPU sets the value of the target MG1 torque Tm1* to "0." Further, the CPU proceeds to step 1080 and calculates the target MG2 torque Tm2* which is the torque to be generated by the second motor 22 so as to make the torque acting on the ring gear equal to the demanded ring gear torque Tr*. Subsequently, the CPU proceeds to step 1055 to step 1060.

(Specific Operation—Search of Control Section by Travel Assisting Apparatus)

Next, specific operation of the travel assisting apparatus 60 will be described.

Figure 13:
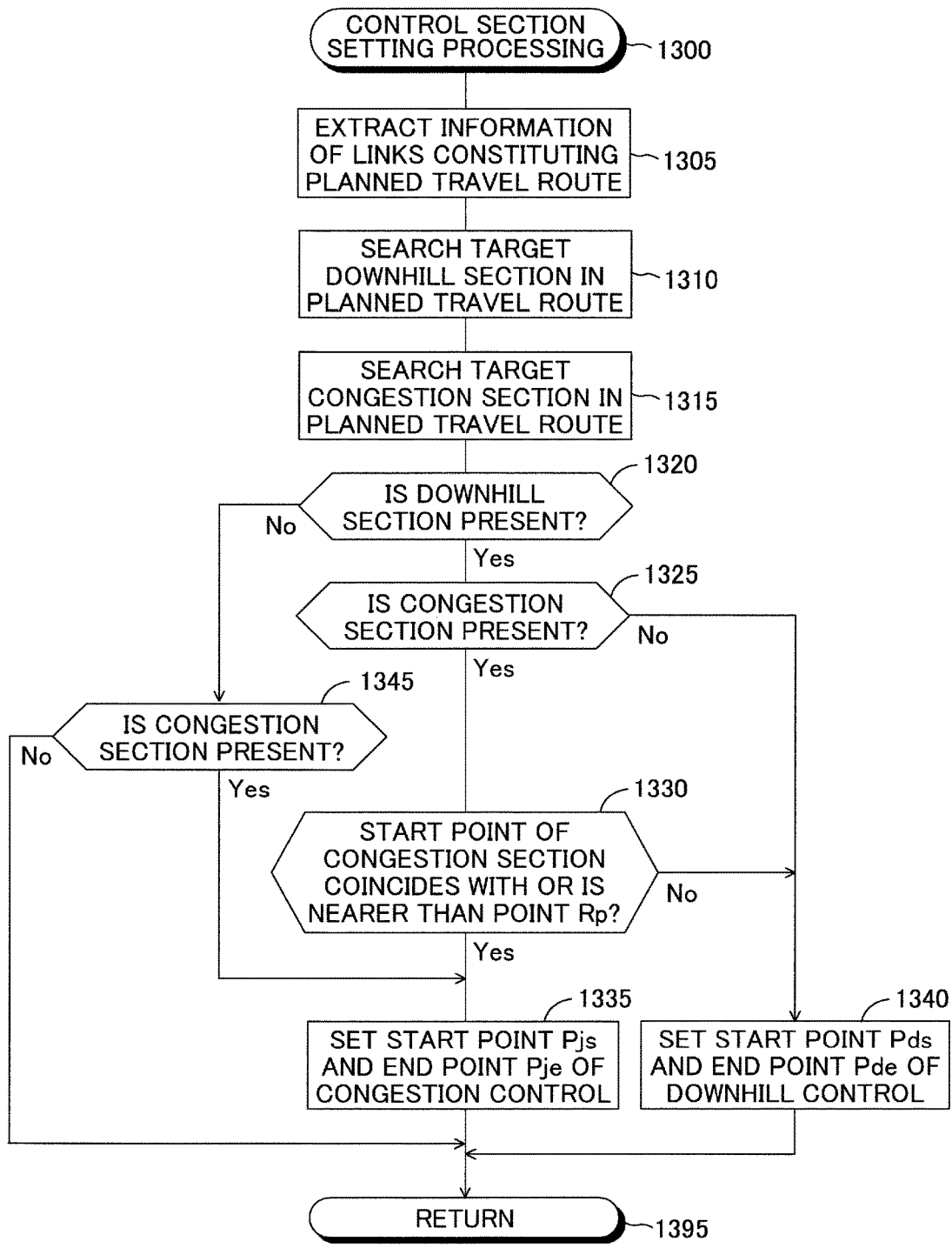
FIG. 13 is a flowchart showing target control section search processing executed by the present control apparatus.

The CPU 66 of the computation section 61 executes a "control section setting processing routine" represented by the flowchart of FIG. 13 when the driver enters a destination and when the vehicle 10 passes through the end point of a downhill section or a congestion section which are searched already.

Accordingly, when a proper timing comes, the CPU 66 starts the processing from step 1300 of FIG. 13 and proceeds to step 1305 so as to extract, from the map database, a planned travel route (a combination of links) extending from the present position Pn to the destination. Notably, in the case where the present routine is executed for the first time after the entry of the destination, the CPU 66 determines a planned travel route on the basis of the present position Pn and the destination and extracts a combination of links of the planned travel route.

Subsequently, the CPU 66 proceeds to step 1310 and searches the closest target downhill section located forward of a point on the planned travel route which is separated from the present position Pn by the pre-use distance Dp. Subsequently, the CPU 66 proceeds to step 1315 and searches all of target congestion sections located forward of a point on the planned travel route which is separated from the present position Pn by the pre-charge distance Dc.

Subsequently, the CPU 66 proceeds to step 1320 and judges whether or not a target downhill section is present. In the case where a target downhill section is present, the CPU 66 makes an affirmative judgment (Yes) in step 1320 and proceeds to step 1325 so as to judge whether or not a target congestion section is present.

In the case where a target congestion section is present, the CPU 66 makes an affirmative judgment (Yes) in step 1325 and proceeds to step 1330 so as to judge whether or not a congestion priority condition is satisfied. The congestion priority condition is satisfied when the start point of the target congestion section coincides with point Rp which is shifted forward from the start point of the target downhill section by the distance threshold Dth3 or the start point of the target congestion section is nearer to the vehicle 10 than point Rp.

When the congestion priority condition is satisfied, the CPU 66 makes an affirmative judgment (Yes) in step 1330 and proceeds to step 1335 so as to set the point shifted back from the start point of the closest target congestion section to the vehicle 10 by the pre-charge distance Dc as the start point Pjs of the congestion control. In addition, the CPU 66 sets the start point of the closest target congestion section as the end point Pje of the congestion control. The start point Pjs and the end point Pje are stored in the RAM 68. Subsequently, the CPU 66 proceeds to step 1395 and ends the present routine.

Meanwhile, when the congestion priority condition is not satisfied, the CPU 66 makes a negative judgment (No) in step 1330 and proceeds to step 1340 so as to set the point shifted back from the start point of the closest target downhill section to the vehicle 10 by the pre-use distance Dp as the start point Pds of the downhill control. In addition, the CPU 66 sets the end point of the closest target downhill section as the end point Pde of the downhill control. The start point Pds and the end point Pde are stored in the RAM 68. Subsequently, the CPU 66 proceeds to step 1395 and ends the present routine.

In step 1325, in the case where a target congestion section is not present, the CPU 66 makes a negative judgment (No) in step 1325 and proceeds to step 1340.

In step 1320, in the case where a target downhill section is not present, the CPU 66 makes a negative judgment (No) in step 1320 and proceeds to step 1345 so as to judge whether or not a target congestion section is present. When a target congestion section is present, the CPU 66 makes an affirmative judgment (Yes) in step 1345 and proceeds to step 1335.

Meanwhile, when a target congestion section is not present, the CPU 66 makes a negative judgment (No) in step 1345 and proceeds to step 1395. Namely, in this case, neither the downhill control nor the congestion control is executed.

(Specific Operation—Execution of Downhill Control and Congestion Control by Travel Assisting Apparatus)

Figure 14:
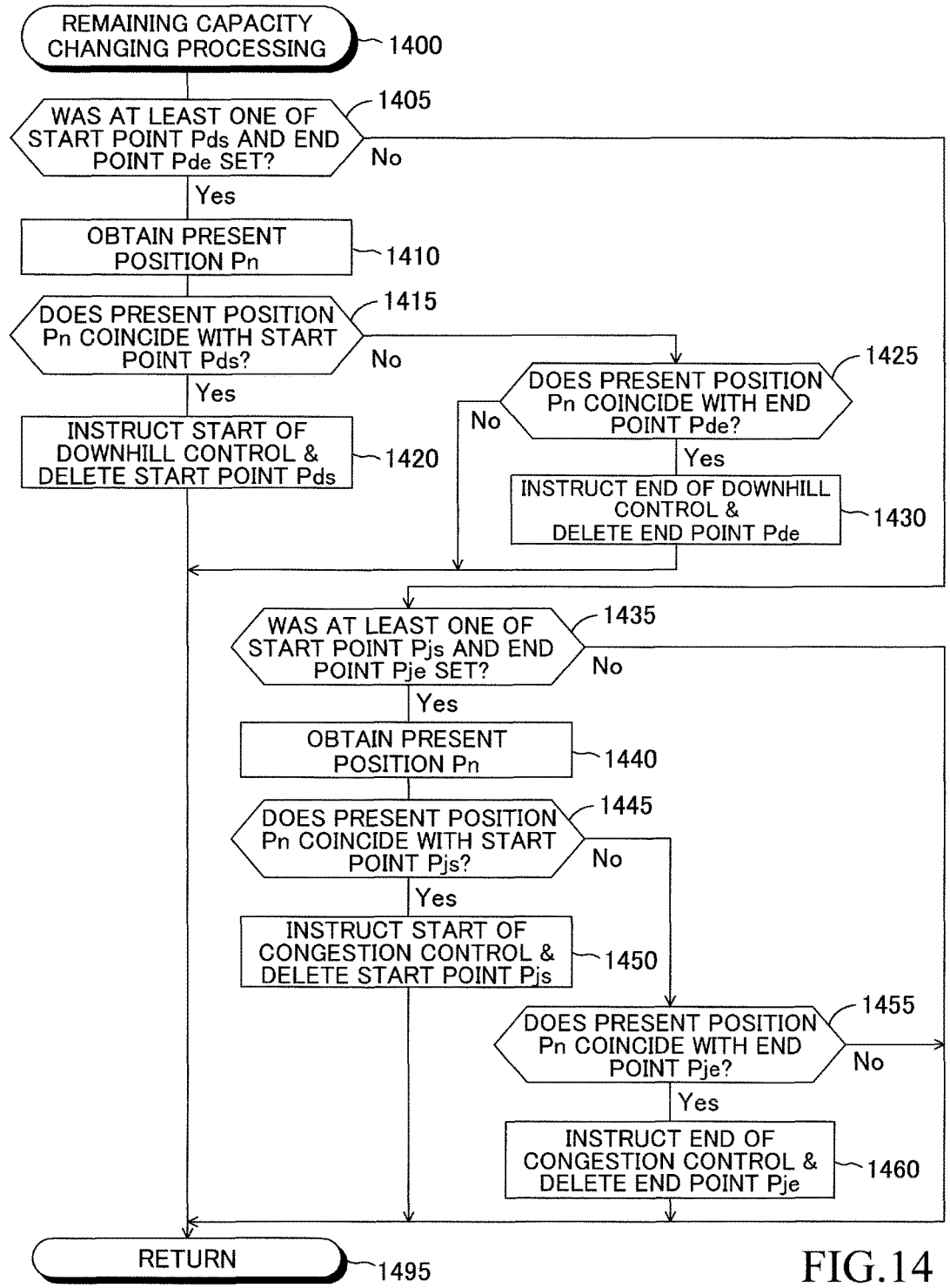
FIG. 14 is a flowchart showing remaining capacity changing processing executed by the present control apparatus.

In order to execute the downhill control and the congestion control, the CPU 66 executes a "remaining capacity changing processing routine" represented by the flowchart of FIG. 14 every time a predetermined period of time elapses. Accordingly, when a proper timing comes, the CPU 66 starts the processing from step 1400 of FIG. 14 and proceeds to step 1405 so as to judge whether or not at least one of the start point Pds of the downhill control and the end point Pde of the downhill control has been set.

In the case where at least one of the start point Pds and end point Pde has been set, the CPU 66 makes an affirmative judgment (Yes) in step 1405 and proceeds to step 1410. In step 1410, the CPU 66 obtains the present position Pn which is obtained by the GPS receiving section 62. Subsequently, the CPU 66 proceeds to step 1415 and judges whether or not the present position Pn coincides with the start point Pds.

In the case where the present position Pn coincides with the start point Pds (in actuarially, falls with a range of "the start point Ps—several tens of meters" to "the start point Ps+several tens of meters"), the CPU 66 makes an affirmative judgment (Yes) in step 1415 and proceeds to step 1420 so as to instruct the ECU 40 to start the downhill control. The ECU 40 having received the instruction changes the target remaining capacity SOC* from the standard remaining capacity Sn to the low-side remaining capacity Sd by executing an unillustrated routine. Further, the CPU 66 deletes the data of the start point Pds. Subsequently, the CPU 66 proceeds to step 1495 and ends the present routine temporarily.

Meanwhile, in the case where the present position Pn does not coincide with the start point Pds (including the case where the start point Pds has been deleted), the CPU 66 makes a negative judgment (No) in step 1415 and proceeds to step 1425 so as to judge whether or not the present position Pn coincides with the end point Pde.

In the case where the present position Pn coincides with the end point Pde, the CPU 66 makes an affirmative judgment (Yes) in step 1425 and proceeds to step 1430 so as to instruct the ECU 40 to end the downhill control. The ECU 40 having received the instruction changes the target remaining capacity SOC* from the low-side remaining capacity Sd to the standard remaining capacity Sn by executing an unillustrated routine. Further, the CPU 66 deletes the data of the end point Pde. Subsequently, the CPU 66 proceeds to step 1495.

In the case where none of the start point Pds and the end point Pde has been set, the CPU 66 makes a negative judgment (No) in step 1405 and proceeds directly to step 1435 so as to judge whether or not at least one of the start point Pjs of the congestion control and the end point Pje of the congestion control has been set.

In the case where at least one of the start point Pjs and end point Pje has been set, the CPU 66 makes an affirmative judgment (Yes) in step 1435 and proceeds to step 1440. In step 1440, the CPU 66 obtains the present position Pn by processing similar to step 1410. Subsequently, the CPU 66 proceeds to step 1445 and judges whether or not the present position Pn coincides with the start point Pjs.

In the case where the present position Pn coincides with the start point Pjs, the CPU 66 makes an affirmative judgment (Yes) in step 1445 and proceeds to step 1450 so as to instruct the ECU 40 to start the congestion control. The ECU 40 having received the instruction changes the target remaining capacity SOC* from the standard remaining capacity Sn to the high-side remaining capacity Sh by executing an unillustrated routine. Further, the CPU 66 deletes the data of the start point Pjs. Subsequently, the CPU 66 proceeds to step 1495 and ends the present routine temporarily.

Meanwhile, in the case where the present position Pn does not coincide with the start point Pjs, the CPU 66 makes a negative judgment (No) in step 1445 and proceeds to step 1455 so as to judge whether or not the present position Pn coincides with the end point Pje.

In the case where the present position Pn coincides with the end point Pje, the CPU 66 makes an affirmative judgment (Yes) in step 1455 and proceeds to step 1460 so as to instruct the ECU 40 to end the downhill control. The ECU 40 having received the instruction changes the target remaining capacity SOC* from the high-side remaining capacity Sh to the standard remaining capacity Sn by executing an unillustrated routine. Further, the CPU 66 deletes the data of the end point Pje. Subsequently, the CPU 66 proceeds to step 1495.

As described above, the present control apparatus (the ECU 40 and the travel assisting apparatus 60) is a hybrid vehicle control apparatus applied to a hybrid vehicle (10) which includes an internal combustion engine (23) and a motor (the first motor 21 and the second motor 22) as drive sources of said vehicle, includes a storage battery (31) for supplying electric power to said motor, and is configured to perform regenerative braking by using said motor, and charge said storage battery with electric power generated as a result of said regenerative braking and electric power generated by using output of said internal combustion engine, said hybrid vehicle apparatus comprising a control portion which controls said internal combustion engine and said motor in such a manner that a demanded drive force (the demanded ring gear torque Tr*) for said vehicle is satisfied and the remaining capacity (SOC) of said storage battery approaches a target remaining capacity (SOC*) set to a standard remaining capacity (Sn) (FIG. 10), wherein said control portion obtains information relevant to a planned travel route of said vehicle (step 1305 of FIG. 13);

said control portion executes downhill control which changes said target remaining capacity to a low-side remaining capacity (Sd) which is less than said standard remaining capacity, in the case where it is judged that a downhill section is contained in said planned travel route on the basis of said information relevant to said planned travel route, when said vehicle travels in a first section which extends to the end point of said downhill section (Pde) from a downhill control start point (Pds) which is shifted back from the start point of said downhill section by a predetermined first distance (pre-use distance Dp) contained in said planed travel route, and said first section containing at least a section extending to the start point of said downhill section from said downhill control start point;

said control portion executes congestion control which changes said target remaining capacity to a higher-side remaining capacity (Sh) which is greater than said standard remaining capacity, in the case where it is judged that a congestion section is contained in said planned travel route on the basis of said information relevant to said planned travel route, when said vehicle travels in a second section which extends to the start point of said congestion section (Pje) from a congestion control start point (Pjs) which is shifted back from the start point of said congestion section by a predetermined second distance (pre-charge distance Dc) contained in said planed travel route; and said control portion is configured to prohibit executing said downhill control according to said downhill section, when said downhill section contained in said planned travel route and said congestion section contained in said planed travel route overlap with each other, and a congestion priority condition is satisfied (step 1330 of FIG. 13), said congestion priority condition being satisfied in the case where a first condition which is satisfied when the start point of said congestion section coincides with the start point of said downhill section or the start point of said congestion section is farther from said vehicle than the start point of said downhill section are satisfied, and a second condition which is satisfied when the start point of said congestion section coincides with a reference point which is shifted forward from the start point of said downhill section by a third distance (distance threshold Dth3) which includes zero or the start point of said congestion section is nearer to said vehicle than said reference point are satisfied.

According to the present control apparatus, when the vehicle 10 travels through a downhill section and a congestion section, it is highly possible that the remaining capacity SOC reaches neither the remaining capacity upper limit Smax nor the remaining capacity lower limit Smin. Therefore, it is highly possible that occurrence of the above-described overflow is avoided and the fuel efficiency improving effect is obtained to a sufficient degree. Further, although the remaining capacity SOC changes significantly, it is more likely that the remaining capacity SOC reaches the remaining capacity upper limit Smax than that the remaining capacity SOC reaches the remaining capacity lower limit Smin. As a result, avoiding the forced charging takes priority over avoiding the overflow. Therefore, it is surely possible that the fuel efficiency decreases is avoided.

(Modification of Embodiment)

Next, a modification of the embodiment will be described.

When the start point of a downhill section is nearer to the vehicle 10 than the start point of a congestion section, the computation section 61 of the travel assisting apparatus 60 described above chooses between the congestion control and the downhill control on the basis of comparison between "the difference between these start points" and "the distance threshold Dth3." In contrast, the computation section 61 according to the present modification is different from the above-described embodiment only in that the computation section 61 according to the present modification chooses between the congestion control and the downhill control on the basis of the absence or presence of overlap between the downhill section and the congestion section. Hereinafter, the difference will be mainly described.

A "target control section search processing routine" which the computation section 61 according to the present modification executes will be described with reference to the flowchart of FIG. 15. Each step shown in FIG. 15 at which the same processing is performed as each step shown in FIG. 13 is given the same step symbol as one given to such step shown in FIG. 13.

Figure 15:
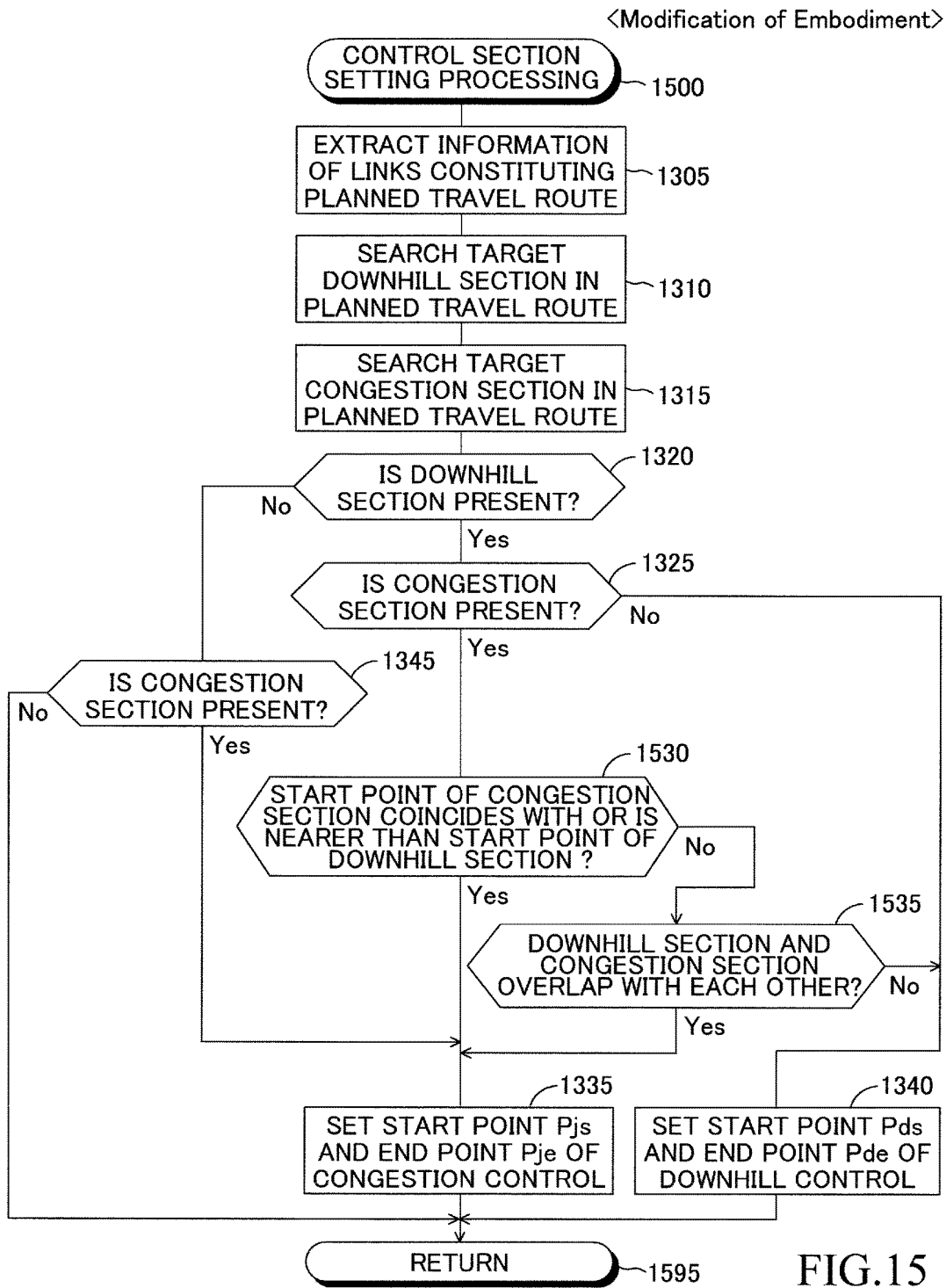
FIG. 15 is a flowchart showing target control section search processing executed by a modification of the present control apparatus.

When a proper timing comes, the CPU 66 starts the processing from step 1500 of FIG. 15 and proceeds to step 1305. When the CPU 66 makes an affirmative judgment (Yes) in step 1325, the CPU 66 proceeds to step 1530 so as to judge whether or not "the start point of the target congestion section coincides with the start point of the target downhill section" or "the start point of the target congestion section is nearer to the vehicle 10 than the start point of the target downhill section." When "the start point of the target congestion section coincides with the start point of the target downhill section" or "the start point of the target congestion section is nearer to the vehicle 10 than the start point of the target downhill section", namely, the start point of the target congestion section is farther to the vehicle 10 than the start point of the target downhill section", the CPU 66 makes a negative judgment (No) in step 1530 and proceeds to step 1535.

Figure 16:
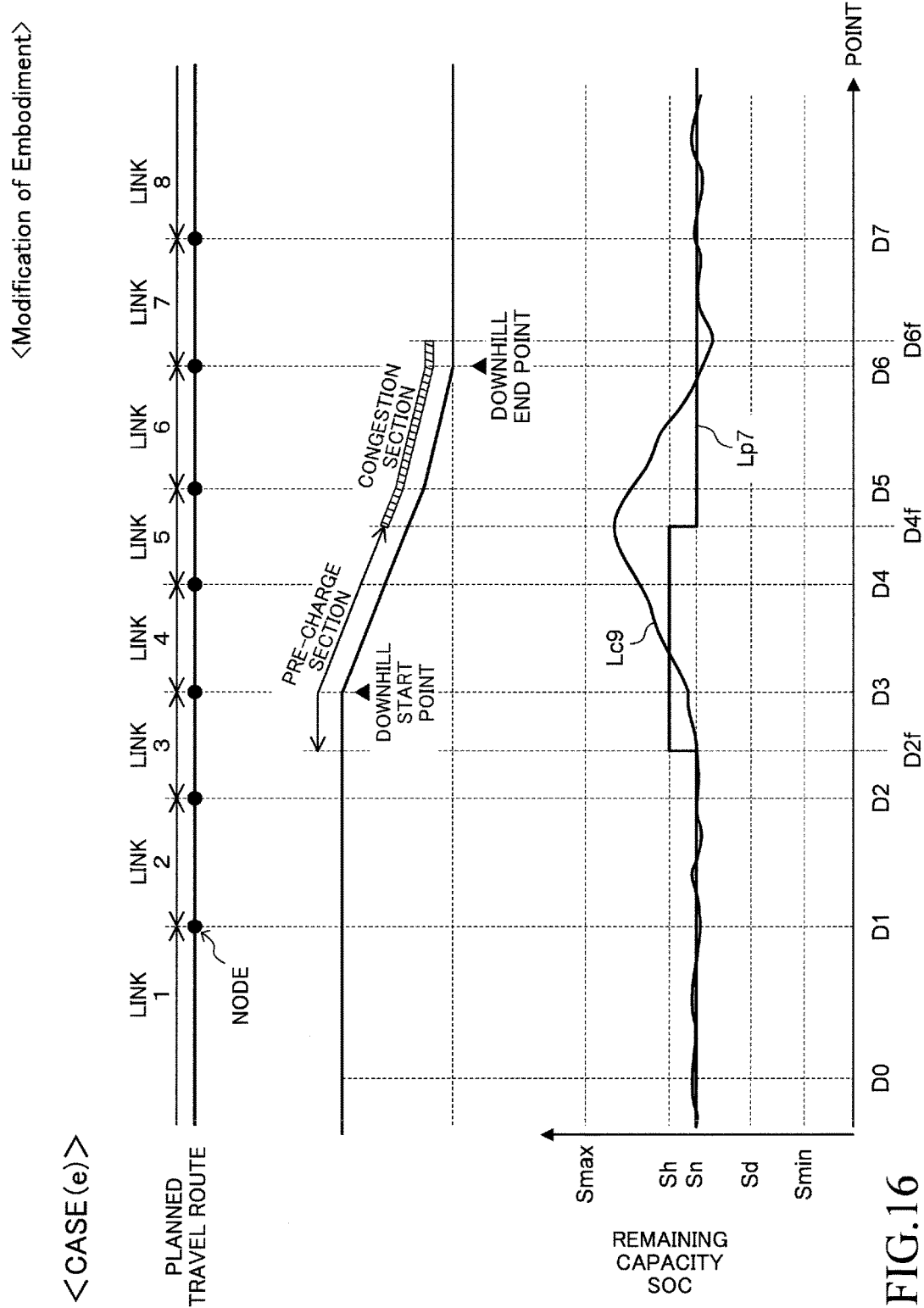
FIG. 16 is a graph which shows a change in remaining capacity when a downhill section and a congestion section are present.

In step 1535, the CPU 66 judges whether or not the target downhill section and the target congestion section overlap with each other. When the target downhill section and the target congestion section overlap with each other, the CPU 66 makes an affirmative judgment (Yes) in step 1535 and proceeds to step 1335. Thus, in this case, the congestion control is executed. An example of this case is shown in the case (e) in FIG. 16. A change in the target remaining capacity SOC* in the case where the congestion control is executed is shown by a polygonal line Lp7. Similarly, a change in the remaining capacity SOC is shown by a curved line Lc9.

As can be understood from the polygonal line Lp7 and the curved line Lc9, when the vehicle 10 reaches point D2f and goes into the pre-charge section, the congestion control is started and the target remaining capacity SOC* is changed to the high-side remaining capacity Sh. As a result, the remaining capacity SOC increases. After that, when the vehicle 10 reaches point D3 and goes into the target downhill section, there is an increase in the increasing rate of the remaining capacity SOC. And then, when the vehicle 10 reaches point D4f and goes into the target congestion section, the remaining capacity SOC decreases until the vehicle 10 reaches point D6f which is the end point of the target congestion section.

In this case, since the remaining capacity SOC decreases due to the traveling of the target congestion section, after the remaining capacity SOC increases due to the traveling of the target downhill section, the remaining capacity SOC reaches neither the remaining capacity upper limit Smax nor the remaining capacity lower limit Smin. Namely, the above-described overflow and forced charging do not occur.

Figure 17:
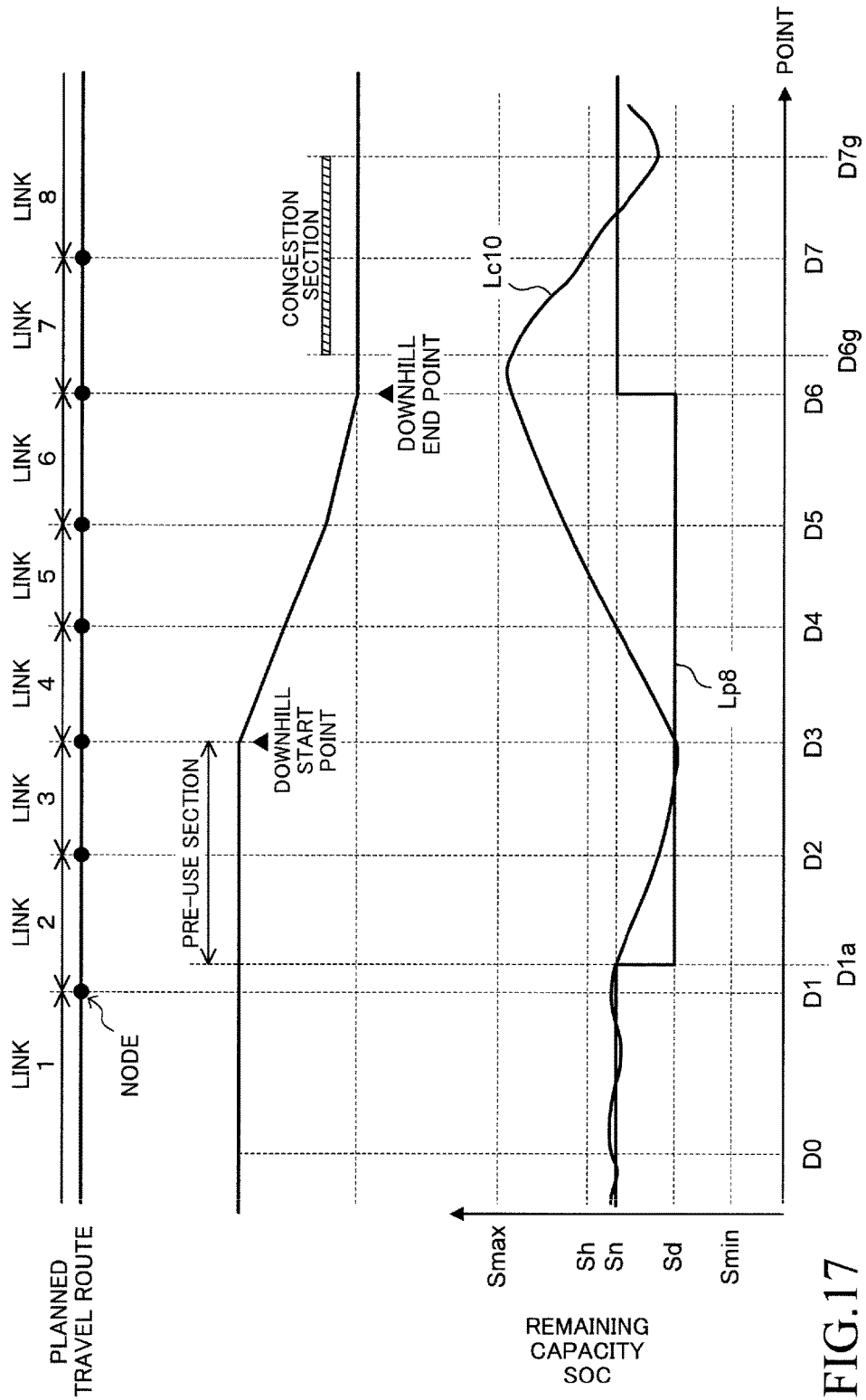
FIG. 17 is a graph which shows a change in remaining capacity when a downhill section and a congestion section are present.

Meanwhile, When the target downhill section and the target congestion section does not overlap with each other, the CPU 66 makes a negative judgment (No) in step 1535 and proceeds directly to step 1340. In this case, the downhill control is executed. An example of this case is shown in the case (f) in FIG. 17. A change in the target remaining capacity SOC* in the case where the downhill control and the congestion control is executed is shown by a polygonal line Lp8. Similarly, a change in the remaining capacity SOC is shown by a curved line Lc10.

As can be understood from the polygonal line Lp8 and the curved line Lc10, when the vehicle 10 reaches point D1a and goes into the pre-use section, the downhill control is started and the target remaining capacity SOC* is changed to the low-side remaining capacity Sd. As a result, the remaining capacity SOC start to decrease. After that, when the vehicle 10 reaches point D3 and goes into the target downhill section, there is an increase in the increasing rate of the remaining capacity SOC due to regenerative braking.

After that, the remaining capacity SOC decreases during the travel of the vehicle 10 from the start point D6g to the end point D7g of the congestion section.

In this case, the remaining capacity SOC decreases due to the traveling of the target congestion section, after the remaining capacity SOC increases due to the traveling of the target downhill section, the remaining capacity SOC reaches neither the remaining capacity upper limit Smax nor the remaining capacity lower limit Smin. Namely, the above-described overflow and forced charging do not occur.

Notably, when the CPU 66 makes an affirmative judgment (Yes) in step 1530, it proceeds to step 1335. Namely, in this case, the congestion control is executed.

According to the present modification, when the start point of the downhill section is nearer to the vehicle 10 than the start point of the congestion section and there is the potential that the remaining capacity SOC cannot be increased to a sufficient degree due to the travel through the downhill section since the downhill section and the congestion section overlap with each other, the congestion control is executed. As a result, it is highly possible that the potential that the remaining capacity SOC is increased before going into the congestion section. Therefore, it is highly likely to avoid such a situation that the remaining capacity SOC decreases to the remaining capacity lower limit Smin.

Although the embodiment of the hybrid vehicle control apparatus according to the present invention have been described, the present invention is not limited to the above-described embodiments and may be changed in various ways without departing from the scope of the present invention. For example, the travel assisting apparatus 60 in the present embodiment receives signals from GPS satellites. However, the travel assisting apparatus 60 may receive other satellite positioning signals in place of or in addition to the GPS signals. For example, the other satellite positioning signals may be GLONASS (Global Navigation Satellite System) and QZSS (Quasi-Zenith Satellite System).

The traffic information receiving section 63 in the present embodiment receives the VICS information as traffic congestion information provided from the outside of the vehicle 10. However, the traffic information receiving section 63 may receive traffic congestion information through other means in place of or in addition to the VICS information. For example, the traffic information receiving section 63 may receive traffic congestion information through mobile communication network (mobile telephone network).

In the case where the downhill control is executed in the present embodiment, when the vehicle 10 reached the end point of the target downhill section, the target remaining capacity SOC* is changed back to the standard remaining capacity Sn from the low-side remaining capacity Sd. However, in the case where the downhill control is executed, when the vehicle 10 reached the start point of the target downhill section, the target remaining capacity SOC* is changed back to the standard remaining capacity Sn from the low-side remaining capacity Sd.

The distance threshold Dth3 in the present embodiment is the fixed value. However, the distance threshold Dth3 may be a value that varies. For example, the distance threshold Dth3 may vary according to depending on whether the downhill section is on an express highway or on an ordinary road.

In the example of FIG. 3, the congestion section starts at the midway of link 4 and ends up at the midway of link 6. Namely, each of the start point and the end point of the congestion section is located midway of link respectively. However, the travel assisting apparatus 60 may deal with information whether congestion is occurs or not per link. Namely, when congestion occurs in a link, the travel assisting apparatus 60 may regard the whole link as the congestion section or a part of the congestion section.

In the present embodiment, when the vehicle 10 has reached the start point Pds of a downhill control section or the end point Pde thereof, the travel assisting apparatus notifies the ECU 40 of the fact that the vehicle 10 has reached the start point Pds or the end point Pde. However, when the travel assisting apparatus decides to execute the downhill control, the travel assisting apparatus may notify the ECU 40 of the distance from the present position Pn to the start point Pds and the distance from the present position Pn to the end point Pde. In this case, the ECU 40 may obtain the distances from the present position Pn at that point in time to the start point Pds and the end point Pde on the basis of the travel distance of the vehicle 10 obtained by integrating the vehicle speed Vs with respect to time, and change the value of the target remaining capacity SOC* when the vehicle 10 reaches the start point Pds or the end point Pde. Similarly, when the travel assisting apparatus decides to execute the congestion control, the travel assisting apparatus may notify the ECU 40 of the distance from the present position Pn to the start point Pjs and the distance from the present position Pn to the end point Pje.

The map database in the present embodiment contains the length and gradient of each link. However, the map database may contain the heights of opposite ends of each link instead of the gradient of each link.

The map database in the present embodiment is constituted by a hard disk drive. However, the map database may be constituted by a solid state drive (SSD) using a recording medium such as flash memory or the like.

What is claimed is:

1. A hybrid vehicle control apparatus applied to a hybrid vehicle which includes an internal combustion engine and a motor as drive sources of said vehicle, and a storage battery for supplying electric power to said motor, and is configured to perform regenerative braking by using said motor, and charge said storage battery with electric power generated as a result of said regenerative braking and electric power generated by using output of said internal combustion engine, said hybrid vehicle apparatus comprising a control portion which controls said internal combustion engine and said motor in such a manner that a demanded drive force for said vehicle is satisfied and the remaining capacity of said storage battery approaches a target remaining capacity set to a standard remaining capacity, wherein:

said control portion obtains information relevant to a planned travel route of said vehicle;

said control portion executes downhill control which changes said target remaining capacity to a low-side remaining capacity which is less than said standard remaining capacity, in the case where it is judged that a downhill section is contained in said planned travel route on the basis of said information relevant to said planned travel route, when said vehicle travels in a first section which extends to the end point of said downhill section from a downhill control start point which is shifted back from the start point of said downhill section by a predetermined first distance contained in said planed travel route, and said first section containing at least a section extending to the start point of said downhill section from said downhill control start point;

said control portion executes congestion control which changes said target remaining capacity to a higher-side remaining capacity which is greater than said standard remaining capacity, in the case where it is judged that a congestion section is contained in said planned travel route on the basis of said information relevant to said planned travel route, when said vehicle travels in a second section which extends to the start point of said congestion section from a congestion control start point which is shifted back from the start point of said congestion section by a predetermined second distance contained in said planed travel route; and said control portion is configured to prohibit executing said downhill control according to said downhill section, when said downhill section contained in said planned travel route and said congestion section contained in said planed travel route overlap with each other, and a congestion priority condition is satisfied, said congestion priority condition is satisfied in the case where a first condition and a second condition are satisfied, said first condition is satisfied when the start point of said congestion section coincides with the start point of said downhill section or the start point of said congestion section is farther from said vehicle than the start point of said downhill section, and said second condition is satisfied when the start point of said congestion section coincides with a reference point, which is shifted forward from the start point of said downhill section by a third distance, or the start point of said congestion section is nearer to said vehicle than said reference point, and said third distance is set such that when said vehicle travels through said downhill section with said third distance, the remaining capacity is increased by the difference between said higher-side remaining capacity and said standard remaining capacity.

2. The hybrid vehicle control apparatus according to claim 1, wherein said control portion executes the congestion control during a travel in a section where said downhill section and said congestion section overlap each other when said congestion priority condition is satisfied.

* * * * *